United States Patent
Saito et al.

[19]

[11] Patent Number: 5,109,887
[45] Date of Patent: May 5, 1992

[54] MULTIWAY VALVE

[75] Inventors: Shiro Saito; Shigeru Takagi; Mineji Kondo, all of Tokoname, Japan

[73] Assignee: Inax Corporation, Aichi, Japan

[21] Appl. No.: 635,584

[22] PCT Filed: May 29, 1990

[86] PCT No.: PCT/JP90/00688
§ 371 Date: Dec. 21, 1990
§ 102(e) Date: Dec. 21, 1990

[87] PCT Pub. No.: WO90/15274
PCT Pub. Date: Dec. 13, 1990

[30] Foreign Application Priority Data

| May 30, 1989 | [JP] | Japan | 1-62920[U] |
| May 31, 1989 | [JP] | Japan | 1-63618[U] |
| Jun. 2, 1989 | [JP] | Japan | 1-64809[U] |
| Jun. 2, 1989 | [JP] | Japan | 1-64810[U] |
| Mar. 22, 1990 | [JP] | Japan | 2-29334[U] |

[51] Int. Cl.$^5$ .............................. F16K 11/056
[52] U.S. Cl. ................. 137/625.46; 137/864; 137/901
[58] Field of Search ........... 137/627, 636, 864, 625.46; 251/901

[56] References Cited

U.S. PATENT DOCUMENTS

| 2,011,601 | 8/1935 | Williams | 137/901 X |
| 2,196,503 | 4/1940 | McFee | 137/901 X |
| 3,753,448 | 8/1973 | Wright | 137/864 |

Primary Examiner—Arnold Rosenthal
Attorney, Agent, or Firm—Kanesaka and Takeuchi

[57] ABSTRACT

A multiway valve having a handle which can be lightly rotated. The valve includes a valve casing (38) provided with an entrance port (64) and plural exit ports (66, 68, 44a). A valve member (40) or a cam shaft (168) which opens and closes the exit ports (66, 68, 44a) is rotatably inserted in the casing (38). One of the exit ports is formed in one end surface of the casing (38), while the others are formed in the outer surface of the casing. Balls (60, 62, 160B, 160C) capable of plugging up the exit ports in the outer surface are mounted in the valve casing (38). The valve member (40) has arms or cams for moving the balls. The exit port in the end surface is opened and closed by the valve member (40) or one ball (160C).

8 Claims, 24 Drawing Sheets

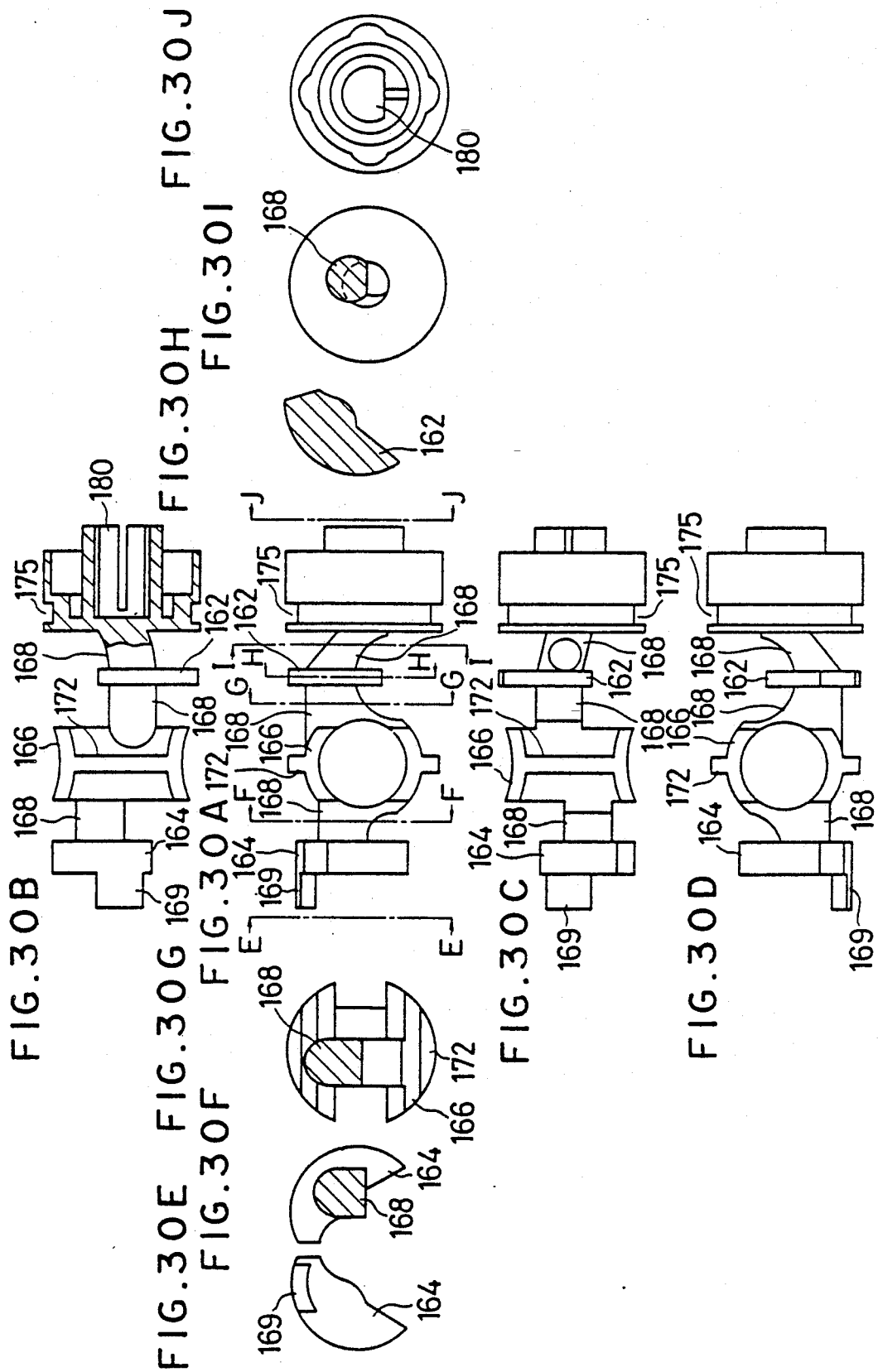

FIG.31A
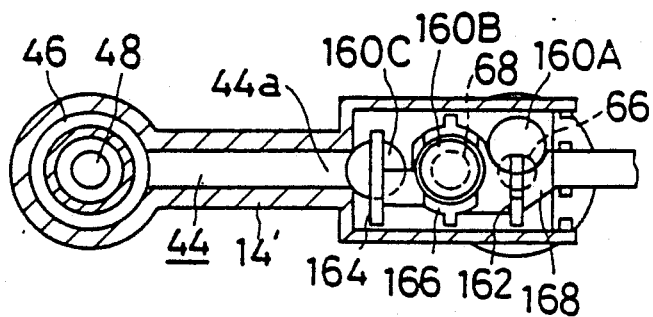
FIG.31B
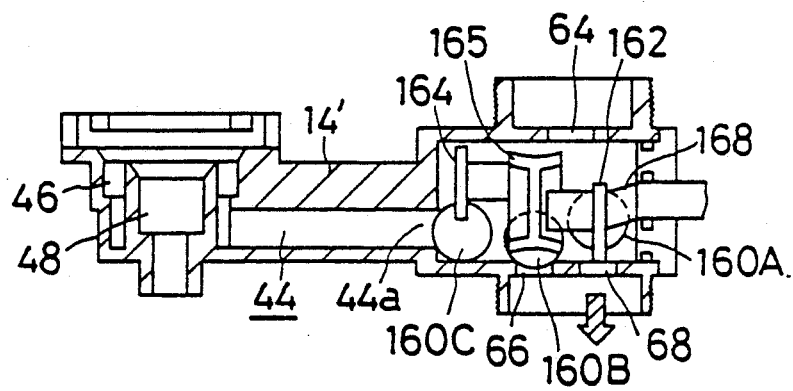
FIG.31C    FIG.31D    FIG.31E
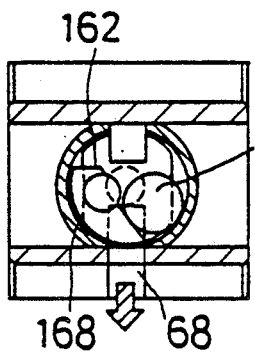 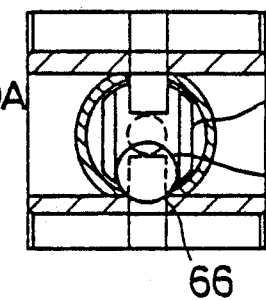 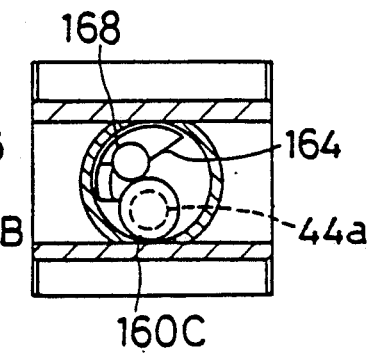

FIG.32A
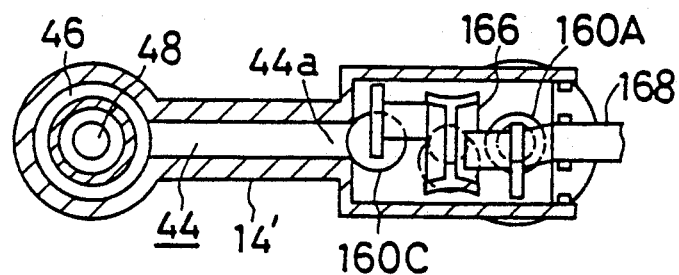
FIG.32B
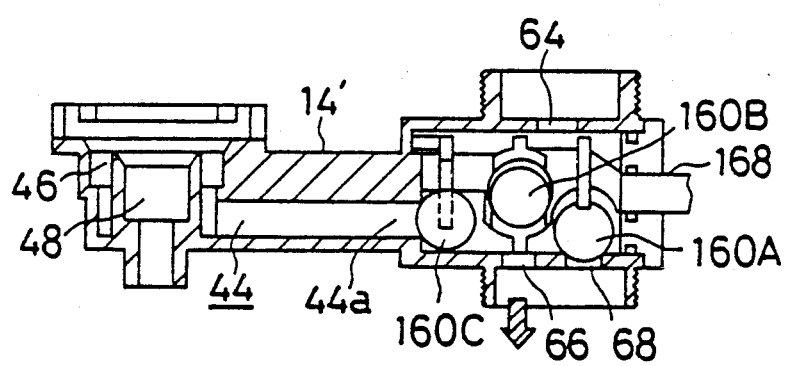
FIG.32C    FIG.32D    FIG.32E
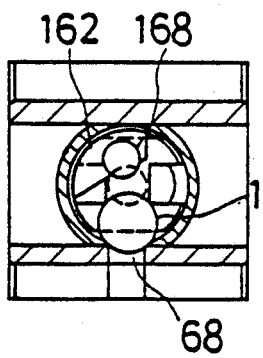 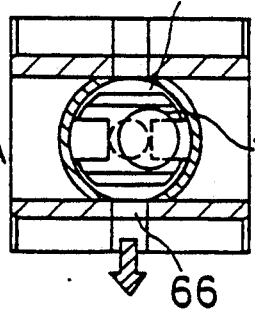 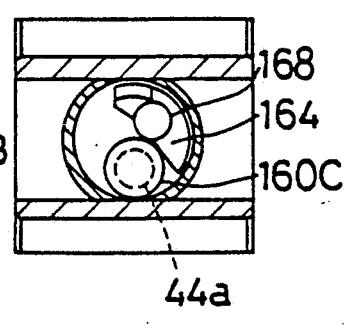

MULTIWAY VALVE

DESCRIPTION

1. Technical Field

The present invention relates to a multiway valve having a valve casing in which balls for opening and closing fluid passages are installed.

2. Background Art

One kind of conventional multiway valve comprises a valve casing and a substantialy cylindrical valve member. The valve casing has a substantially cylindrical water chamber, and is provided with an entrance port and plural exit ports for introducing and discharging fluid such as water. The valve member has a fluid passage that can connect the entrance port with one of exit ports. The fluid passage in the multiway valve can be switched between plural channels by rotating the valve member about its axis. In this conventional multiway valve using such a cylindrical valve member, a large area of this valve member makes sliding contact with the valve casing. Hence, a large force is needed to rotate the valve member.

DISCLOSURE OF THE INVENTION

It is an object of the invention to provide a multiway valve having a handle which can be rotated lightly.

In a first embodiment of the invention, the multiway valve comprises a valve casing and a movable valve member. The casing is provided with an entrance port and plural exit ports for introducing and discharging fluid such as water. One of the exit ports is formed in one end surface of the valve casing, while the remaining ports are formed in the outer surface of the casing. Balls are installed in the casing so as to be able to close the exit ports in the outer surface. The rotatable valve member having a valve body and arms is inserted in the casing. When the valve member is rotated to any one of given angular positions, the arms push aside the corresponding one of the balls to open the corresponding exit port in the outer surface of the casing. The exit port in the end surface of the casing is surrounded by a seal with which the end surface of the valve member makes sliding contact.

In this first embodiment, when the valve member is rotated to any one of given angular positions, the arms move the corresponding one of the balls away from the corresponding exit port in the outer surface of the valve casing to open this exit port, thus permitting the fluid to flow out. When the valve member is rotated to another angular position, the valve member opens the exit port in the end surface of the casing.

In this way, the balls open and close the exit ports in the outer surface in the valve casing. It substantially follows that the valve member makes sliding contact with the seal surrounding the exit port in the end surface. This can greatly reduce the area of the portion of the valve member which makes contact with the seal.

In a second embodiment of the invention, a groove accommodating a lip seal is formed around the exit port in the end surface of the valve casing. The thickness of the seal is increased near the front end of the seal as viewed in the direction in which the seal is inserted.

In this embodiment, the seal is thickened around the front end of the seal as viewed in the direction of insertion and, therefore, the thickened portion firmly adheres to the inner surface of the groove. This prevents leakage of water and prevents the lip seal from coming off.

In a third embodiment of the invention, a groove receiving a lip seal is formed around the exit port in the end surface of the valve casing. Plates are interposed between the outer surface of the lip seal and the inner surface of the groove which receives the seal. The plates protrude from the end surface.

In a fourth embodiment of the invention, a groove receiving a lip seal is formed around the exit port in the end surface of the valve casing. The lip seal is received in the groove. The fringe of the groove can protrude from the end surface.

In the third or fourth embodiment, the plates or protrusions are formed in the multiway valve. The portion of the lip seal which protrudes from the end surface is supported by the plates or protrusions. When the movable valve member moves, deformation of the lip seal is suppressed greatly. This prevents leakage of water. Although the seal is repeatedly deformed, it hardly deteriorates.

In another embodiment of the invention, a movable valve member is rotatably inserted in the valve casing provided with an entrance port and plural exit ports to open and close the exit ports. The exit ports are located in the outer surface of the casing. Balls capable of plugging up the exit ports are installed in the casing. The movable valve member has arms for moving the balls. The arms have pawls at their front ends to scoop up the balls.

In this embodiment, when the movable valve member is rotated to any one of given angular positions, the corresponding one of the arms moves the corresponding one of the balls away from the corresponding exit port in the outer surface of the valve casing to open the port, thus allowing the fluid to flow out. When the valve member is rotated to another angular position, the valve member opens the exit port in the end surface of the casing. In this way, the balls open and close the exit ports in the outer surface of the casing. Consequently, the area of the portion of the valve member which makes sliding contact can be made very small.

In a further embodiment of the invention, a rotating shaft is inserted in the valve casing provided with an entrance port and plural exit ports. Balls capable of plugging up the exit ports are installed in the casing. The shaft has cams and a cylindrical portion holding the balls. When the shaft is rotated to any one of given angular positions, the corresponding cam moves the corresponding ball away from the corresponding exit port. When the shaft reaches one of two certain angular positions spaced from each other by about 180°, the cylindrical portion causes the corresponding ball to drop, for closing the corresponding exit port.

In this embodiment, when the shaft is rotated to any one of given angular positions, the corresponding cam or the cylindrical portion moves the corresponding ball away from the corresponding exit port to open it. As a result, the fluid flows out.

The angular position at which one cam pushes away the corresponding ball to open the corresponding exit port can be determined by adjusting the angular positional relation of the cam to the shaft and the circumferential dimension of the cam. Also, the angular position can be determined by adjusting the angular positional relation of the cylindrical portion to the shaft. Therefore, the relation between the angular position and the opened exit port can be set at will. Since the balls open and close the exit ports, the area of the portion of the valve member which makes sliding contact can be made very small.

In a still other embodiment of the invention, the movable valve member is provided with holes receiving balls capable of plugging up the exit ports, respectively, formed in the outer surface. The side wall forming each hole is provided with notches. The fringe of each notch is chamfered to prevent the balls from becoming damaged.

In this embodiment, the balls roll inside their respective holes. If the balls are urged into sliding contact with the walls defining the notches by hydraulic pressure, the surfaces of the ball valves are not damaged, because they are chamfered. In this way, wear of the ball valves and damage to them are prevented well. This increases the durability of the ball valves, thus improving the function and the durability of the whole water purifier.

BRIEF DESCRIPTION OF THE DRAWINGS

FIG. 30A is a front elevation view of the cam shaft shown in FIGS. 27 and 28;

FIG. 30B is a plan view of the cam shaft shown in FIG. 30A;

FIG. 30C is a bottom view of the cam shaft shown in FIGS. 30A and 30B;

FIG. 30D is a rear view of the cam shaft shown in FIGS. 30A, 30B, and 30C;

FIG. 30E is a view taken along line E—E of FIG. 30A;

FIG. 30F is a cross-sectional view taken along line F—F of FIG. 30A;

FIG. 30G is a cross-sectional view taken along line G—G of FIG. 30A;

FIG. 30H is a cross-sectional view taken along line H—H of FIG. 30A;

FIG. 30I is a cross-sectional view taken along line I—I of FIG. 30A;

FIG. 30J is a cross-sectional view taken along line J—J of FIG. 30A;

FIGS. 31A, 31B, 31C, 31D, 31E, 32A, 32B, 32C, 32D, 32E, 33A, 33B, 33C, 33D, and 33E are cross-sectional views of the faucet shown in FIG. 27, for illustrating the operation.

BEST MODE FOR CARRYING OUT THE INVENTION

Figure 1:
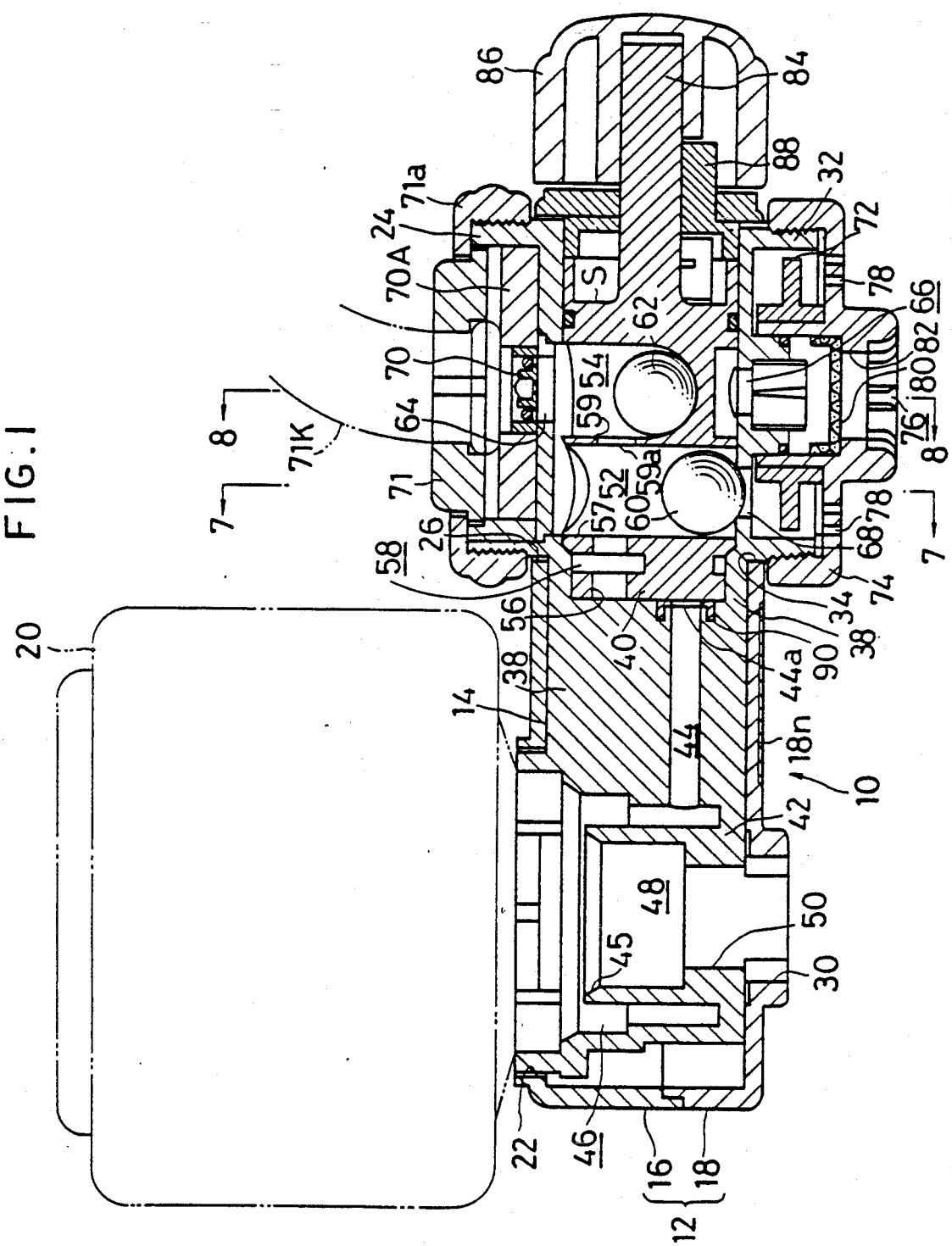
FIG. 1 is a plan view in cross section of a multiway valve according to the invention, the view being taken along line 1—1 of FIG. 3.

Referring to FIGS. 1-11, there is shown a faucet 10 equipped with a water purifier. This faucet comprises a faucet casing 12 and a rotating valve 14 mounted in the casing. The faucet casing 12 consists of an upper casing 16 and a lower casing 18. The upper casing 16 has a cross section similar to a running track. An opening 22 in which a water-purifying cartridge 20 is mounted is formed at one side of the upper surface of the upper casing 16. Another opening 26 is formed at the other side of the upper surface so that the inflow portion 24 of the rotating valve 14 may be located outside the casing 12. The cartridge 20 is loaded with activated carbon.

The lower casing 18 also has a cross section similar to a running track. An opening 30 is formed at one side of the lower casing 18 so that the purified water delivery port may be located outside the faucet casing 12. Another opening 34 is formed at the other side so that the outflow portion 32 of the rotating valve 14 may be located outside the casing 12.

The structure of the rotating valve 14 is now described. The valve includes a valve casing 38 in which a movable valve member 40 is inserted. A water-purifying cartridge connector 42 is formed integrally with the casing 38. The casing 38 is designed so that water passed through the valve member 40 can flow into the connector 42 via a connection passage 44. The cartridge 20 has an exit port, a seat 45 being located at the position of the connector 42 to face the exit port. The seat 45 extends upward from the bottom surface of the valve casing 38. An outside passage 46 and an inside passage 48 are formed respectively outside and inside the seat 45.

The water-purifying cartridge 20 has the exit port for discharging processed water, the exit port being located in the center of the bottom surface. A processed water intake port is formed around the exit port in a coaxial relation to it. The cartridge 20 is loaded with an element such as activated carbon.

Water is introduced into the outside passage 46 and flows through the processed water intake port. Then, the water is passed into the water-purifying cartridge 20 and purified by the element inside the cartridge. The purified water is made to flow into the inside passage 48 from the processed water exit port. A purified water delivery port 50 protrudes downward below the seat 45.

The movable valve member 40 is substantially cylindrical in shape and has a first ball-holding hole 52 and a second ball-holding hole 54.

As clearly shown in FIGS. 9A, 9B, 10A, 10B, 11A, and 11B, the ball-holding hole 52 is a notch which is formed in the movable valve member 40 so as to extend perpendicularly to the axis of the valve member. A hole 56 is formed in one end surface of the valve member 40. The ball-holding hole 52 is in communication with the hole 56 in the end surface via a channel 58 in the form of a groove. A ball 60 is inserted in the ball-holding hole 52.

The ball-holding hole 54 is a notch formed in the movable valve member 40 so as to extend perpendicularly to the axis of the valve member. This hole 54 extends at right angles to the ball-holding hole 52. A ball 62 is inserted in the hole 54.

A partition wall 57 partitions the ball-holding hole 52 from the channel 58. Another partition wall 59 partitions the ball-holding hole 52 from the ball-holding hole 54. The walls 57 and 59 are provided with notches 57a and 59a, respectively. The channel 58, the ball-holding holes 52 and 54 are placed in communication with each other via the notches 57a and 59a. The rear sides of the holes 52 and 54 are cut out to form chordal channels 52A and 54A, respectively. Arms 52a and 54a (described later) are formed between the ball-holding holes 52 and the channel 52a and between the ball-holding hole 54 and the channel 54a, respectively.

As clearly shown in FIGS. 7, 8, 12A, and 12B, pawls 92 and 94 which protrude into the ball-holding holes 52 and 54, respectively, are formed at the front ends of the arms 52a and 54a, respectively, i.e. at the ends as viewed perpendicularly to the axis of the movable valve member 40. When the arms 52a and 54a are rotated to move the balls 60 and 62 away from a shower exit port 68 and a tap water exit port 66, respectively, the pawls 92 and 94 bear against the lower halves of the balls 60 and 62, respectively. The pawls scoop up the balls 60 and 62 in moving them away from the exit ports 68 and 66, respectively. Therefore, when the arms 52a and 54a bear on the balls 60 and 62, respectively, these balls are quite smoothly moved away from the exit ports 68 and 66, respectively. Because the balls 60 and 62 are not pressed against the fringes of the exit ports 68 and 66 by the arms 52a and 54a, the durability of these fringes and the balls 60, 62 is improved.

Figure 12B:
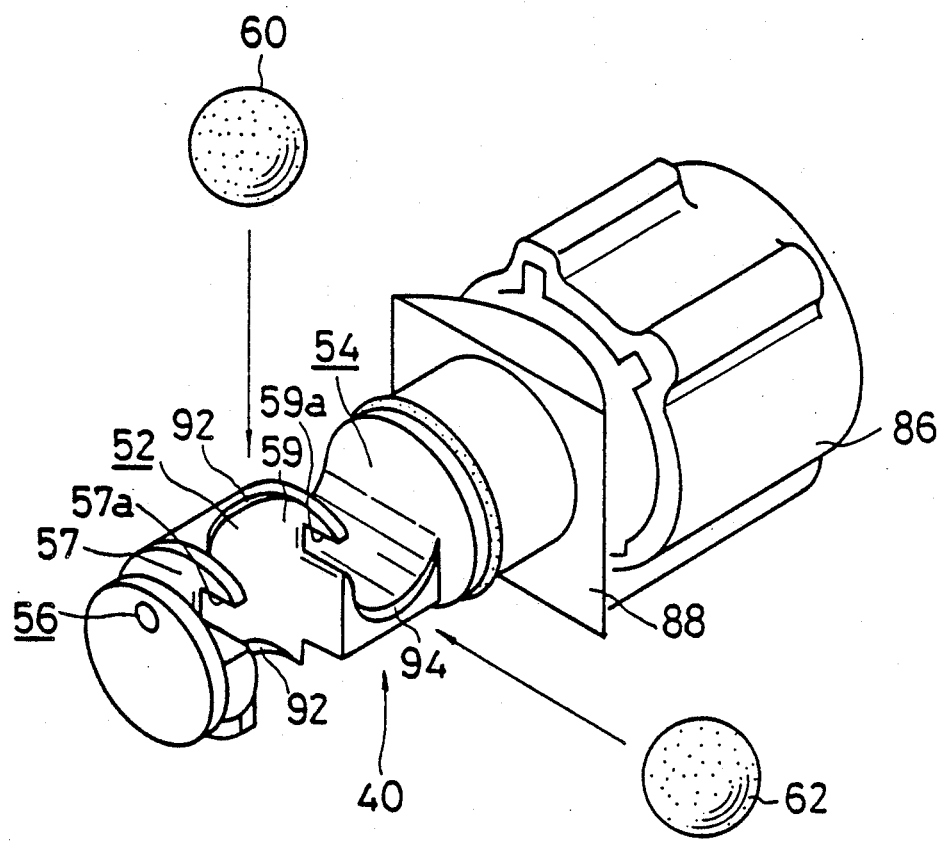
FIG. 12B is a perspective view of the movable valve member shown in FIG. 12A.

As clearly shown in FIG. 12B, the inner fringes R (not shown) of the openings of the notches 57a and 59a are chamfered. Therefore, when the balls 60 and 62 roll in the ball-retaining holes 52 and 54, respectively, or when the balls 60 and 62 are hydraulically pressed against the inner fringes of the openings of the notches 57a and 59a, respectively, the balls 60 and 62 are prevented from becoming damaged. Where the balls 60 and 62 are made of a resilient material such as rubber, the durability of the balls 60 and 62 are secured.

The upper surface of the valve casing 38 has an exit port 64. The lower surface has a tap water exit port 66 (or regulated outflow port) and a shower exit port 68.

An annular seal 70A is fitted in the inflow portion 24 so as to cover the exit port 64. The seal 70A is retained by an adapter 71 and a cap nut 71a. The adapter 71 can be fitted over the front end of a delivery pipe 71K connected with a water pipe. This enables the multiway valve 10 to be mounted at the front end of the delivery pipe 71K. The cap nut 71a is screwed to the outer surface of the inflow portion 24 from above. A constant flow valve 70 is mounted in the opening in the center of the seal 70A.

The tap water exit port 66 is a cylinder extending downward from the valve casing 38. A baffle board 72 is fitted over this cylinder and disposed opposite to the shower exit port 68.

A holder 74 is screwed over the outer surface of the outflow portion 32 and holds the baffle board 72. A tap water delivery port 76 is formed in the center of the holder 74 and in communication with the tap water exit port 66.

Shower exit holes 78 are formed in the outer surface of the holder 74 and in communication with the shower exit port 68. A piece of mesh 80 is held by protrusions 82 formed on the inner surface of the tap water exit port 76.

An end surface exit port 44a which forms the entrance of the connection passage 44 is formed in the valve casing 38 opposite to the front end surface of the movable valve member 40. The exit port 44a and the end surface opening 56 are radially equidistant from the axis of the valve member 40. When the valve member is rotated to the posture shown in FIG. 9, the passage 44 is placed in communication with the end surface opening 56.

A lip seal 90 is mounted to the valve casing 38 so as to surround the end surface exit port 44a. The end surface of the valve member 40 is in sliding contact with the seal 90 which is fitted in a groove formed around the end surface exit port 44a.

The end surface exit port 44a is formed in a slightly sunken portion. Thus, if the valve member 40 is forced into the valve casing 38, then the valve member 40 comes into abutment with the higher portion around the exit port 44a. Hence, the lip seal 90 is not compressed excessively, whereby it will not be damaged. Also, it is prevented from coming off the groove.

Figure 17:
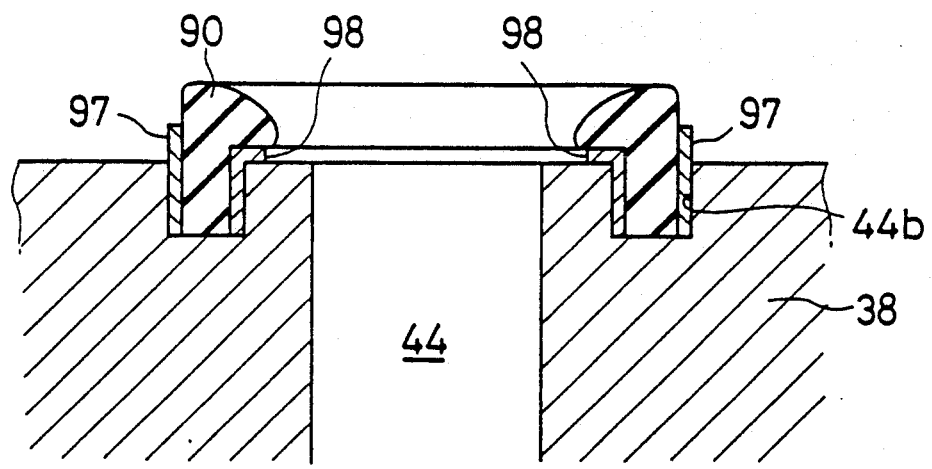
FIGS. 17, 18, 19, 20, 21, 22, 23, 24, 25, and 26 are cross sectional views of a seal, showing various methods by which the seal is mounted.
Figure 18:
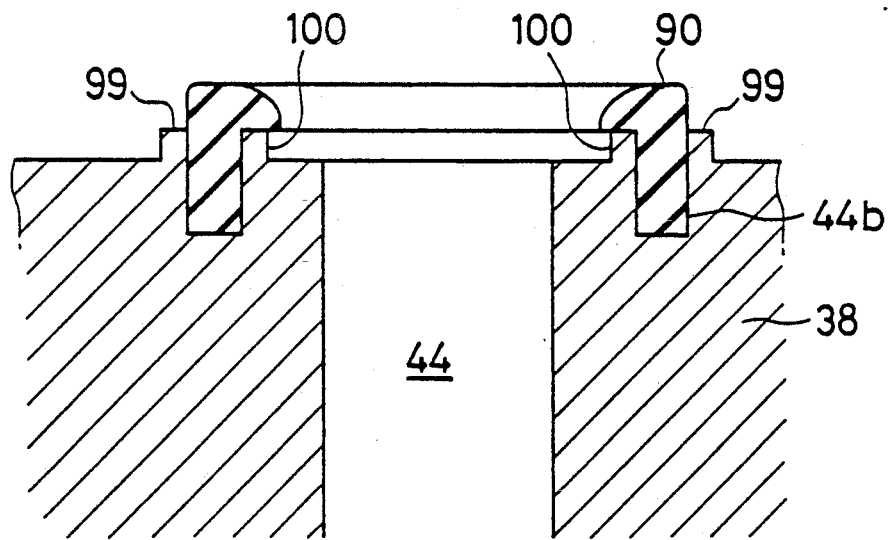
Figure 19:
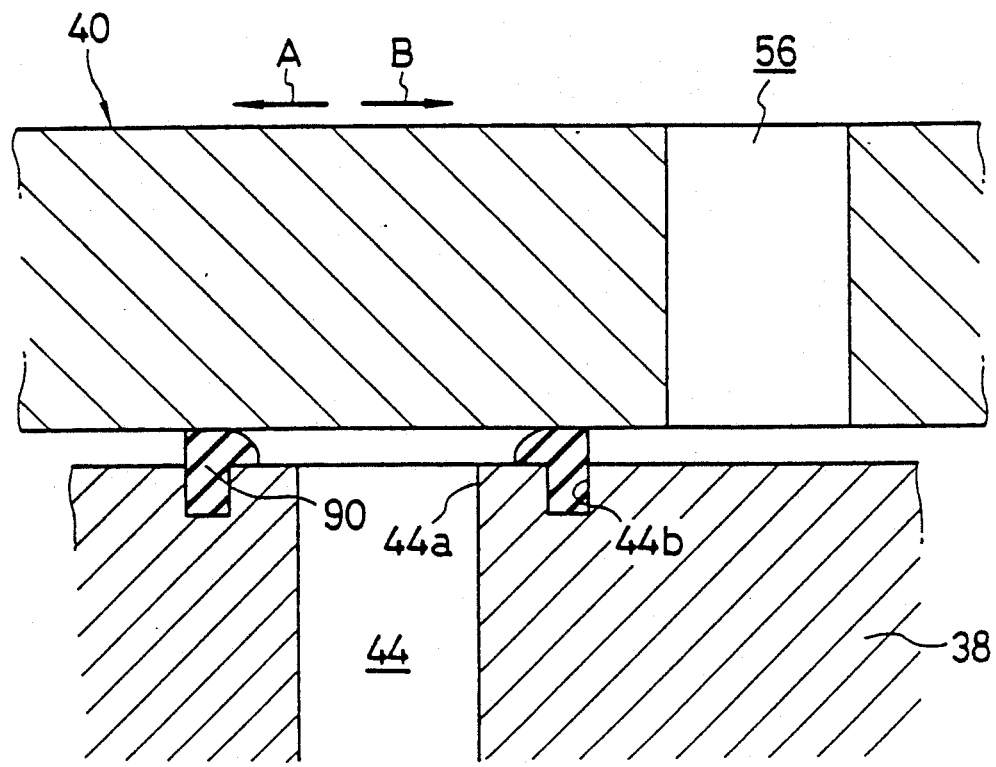

The structure for mounting the lip seal 90 is next described by referring to FIGS. 17-26. As shown in FIG. 19, a groove 44b receiving the lip seal is formed around the end surface exit port 44a in the rotating valve 14. The end surface of the movable valve member 40 is in sliding contact with the lip seal 90 received in the groove 44b. When the valve member 40 is rotated as indicated by A in FIG. 19 to place the opening 56 formed in the end surface in communication with the exit port 44a in the end surface, water is expelled.

Figure 20:
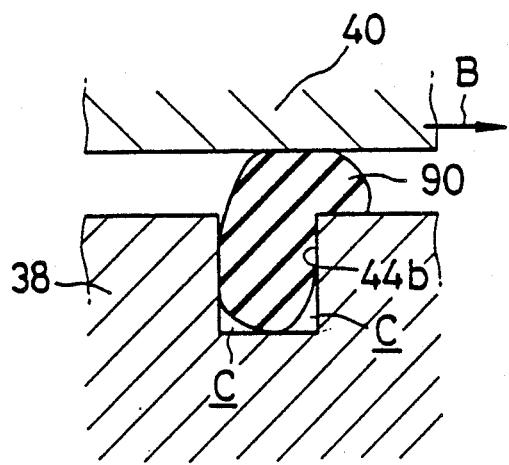
Figure 21:
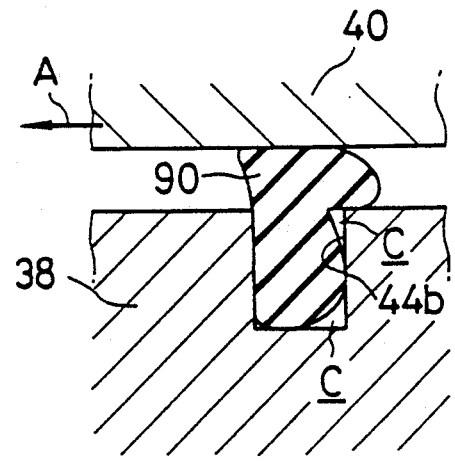

In the embodiment shown in FIG. 19, when the movable valve member 40 rotates, the lip seal 90 is deformed by frictional force as shown in FIGS. 20 and 21, thus tending to form a gap C between the seal 90 and the inner surface of the groove 44b. If this gap C is created, leakage of water may take place. Also, whenever the valve member 40 rotates, the lip seal 90 is deformed to a great extent. This may lead to a deterioration in the durability of the seal 90. These problems are solved by embodiments shown in FIGS. 17, 18, 22-26.

Referring to FIG. 17, plates 97 and 98 are mounted between the inner surface of the groove 44b and the outer surface of the lip seal 90. The front ends of the plates 97 and 98 protrude from the groove 44b. The plates 97 and 98 are annular in form. The plate 97 holds the seal 90 from the side of the outer surface. The plate 98 holds the seal 90 from the side of the inner surface.

Referring to FIG. 18, protrusions 99 and 100 are formed around the groove 44b. The protrusion 99 holds the seal 90 from the side of the outer surface. The protrusion 100 holds the seal 90 from the side of the inner surface.

The plates 97, 98 or the protrusions 99, 100 suppress deformation of the lip seal 90 if the movable valve member 40 is rotated in the direction indicated by A or B. Accordingly, if the valve member 40 is rotated, the gap C is not created, thus preventing leakage of water. Because the seal 90 deforms little, the seal 90 is deformed a little each time the valve member 40 is rotated. Hence, the durability of the lip seal is enhanced.

In the above examples, the plates 97, 98 or the protrusions 99, 100 are formed on the side of the end surface exit port 44 in the groove 44b, as well as on the opposite side. The plates or the protrusions may be formed only on one side.

Figure 22:
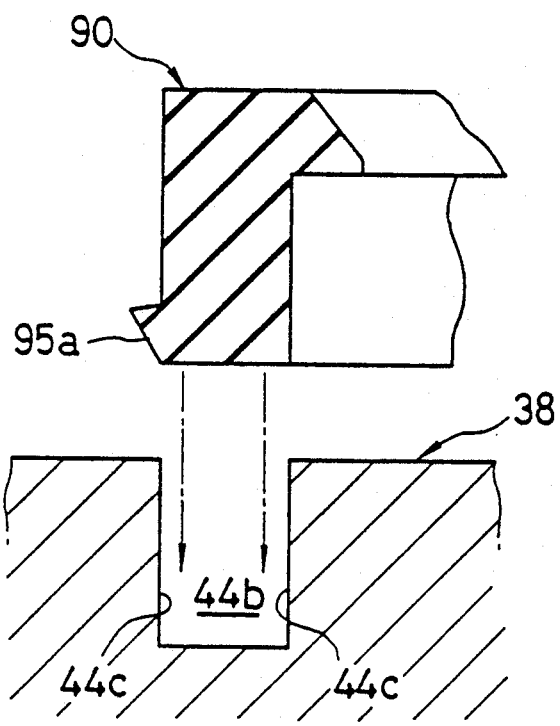

Referring to FIG. 22, a thick-walled portion 95a is formed at the front end of the outer surface of the lip seal 90 as viewed in the direction in which the seal is inserted into the groove 44b. When the seal 90 is inserted into the groove 44b, the thick-walled portion 95a is pressed against the inner surface 44c of the groove 44b, thus greatly enhancing the watertightness. Also, the seal 90 does not easily come off the groove 44b.

Figure 23:
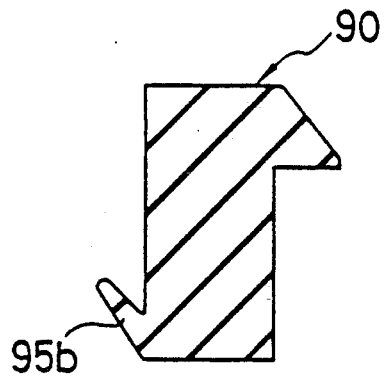

In FIG. 23, the thick-walled portion 95b is shaped like a fin. When the lip seal 90 is about to come off the groove 44b, the fin-shaped thick-walled portion 95b produces great resistance to impede the withdrawal of the seal 90 from the groove 44b. Of course, the watertightness is excellent.

Figure 24:
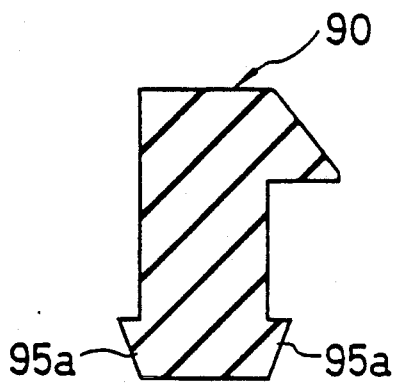
Figure 26:
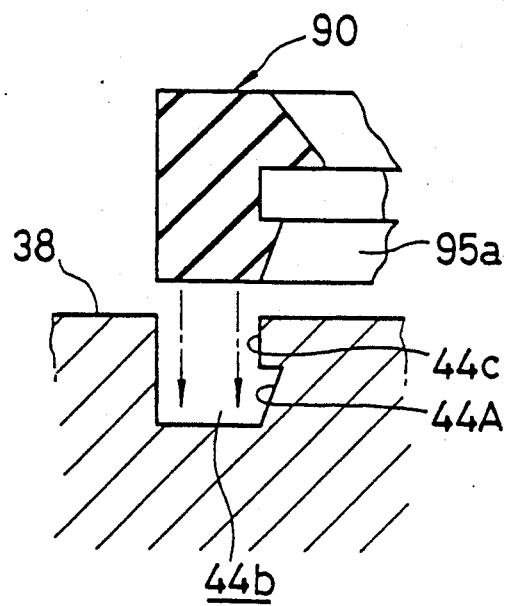

In the examples shown in FIGS. 22 and 23, the thick-walled portions 95a and 95b are formed only on the outer surface of the lip seal 90. As shown in FIG. 24, another thick-walled portion 95a can be formed on the inner surface. As shown in FIG. 26, a thick-walled portion 95a can be formed only on the inner surface of the lip seal.

Figure 25:
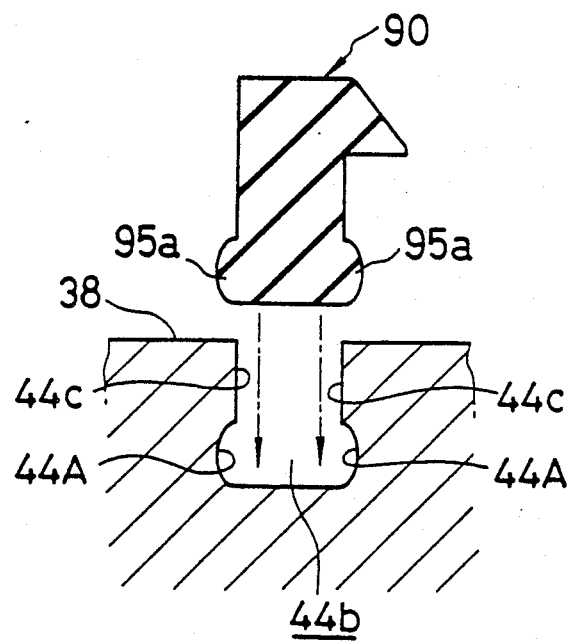

Referring next to FIG. 25, the inner surface 44c of the groove 44b is provided with a recess 44A. The thick-walled portion 95a of the seal 90 is engaged in the recess 44A. Thus, it is very difficult for the seal 90 to come off the groove 44b. Furthermore, the watertightness is improved.

Referring to FIG. 26, a recess 44A is formed only on one side of the inner surface 44c of the groove 44b. The lip seal 90 having a thick-walled portion 95a is inserted in the groove 44b. In this example, the seal 90 is mounted in the valve casing 38. Alternatively, the lip seal 90 can be mounted in the movable valve member 40.

An operation shaft 84 protrudes from the end surface S opposite to the end surface opening 56 in the movable valve member 40. A handle 86 is fitted over the shaft 84 which extends through the faucet casing 12.

Figure 13:
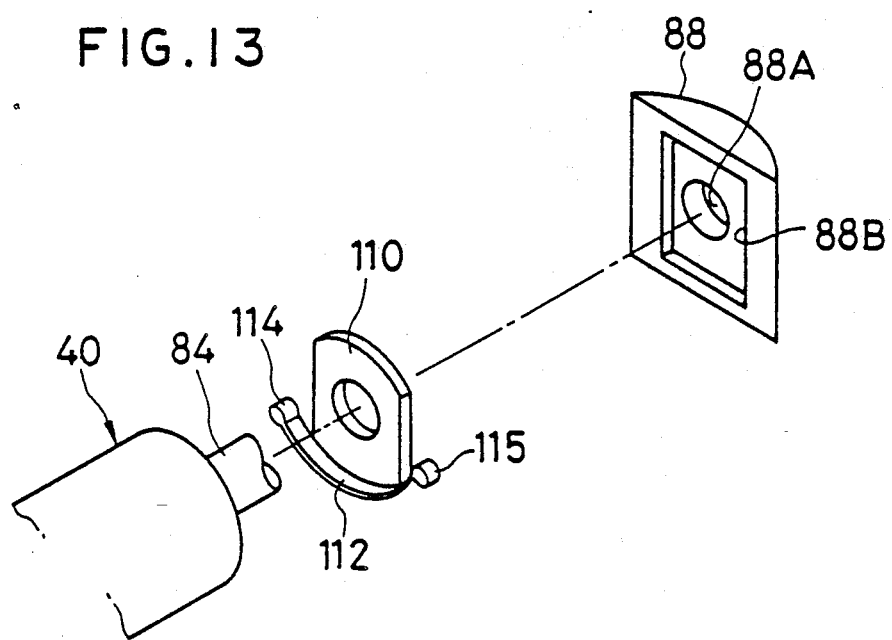
FIGS. 13 and 14 are exploded perspective views of a portion by which the movable valve member shown in FIGS. 9A, 10A, 11A, 12A, 12B is pivotally mounted.
Figure 14:
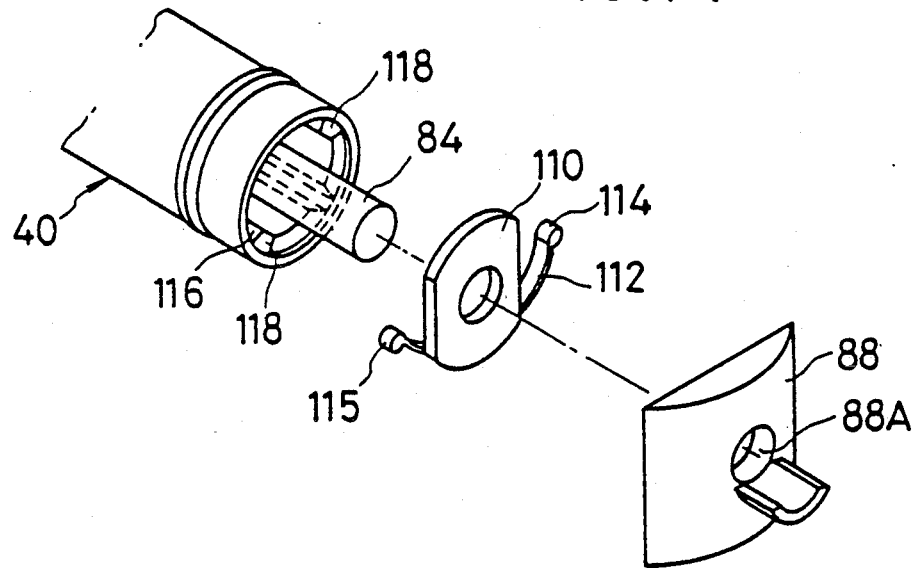

As best shown in FIGS. 13 and 14, the operation shaft 84 is rotatably inserted in a hole 88A formed in a bearing plate 88. This plate 88 is provided with a rectangular recess 88B. A substantially rectangular clicking plate 110 engages the recess 88B. The plate 110 has a resilient and curved arm 112 protruding laterally to both sides. Small cylindrical portions 114 and 115 are formed at the front ends, respectively, of the arm 112. The clicking plate 110 enters an annular hole 116 formed in one end surface of the movable valve member 40. Four recesses 118 which are circumferentially regularly spaced from each other are formed in the inner surface of the hole 116. The cylindrical portions 114 and 115 at the front ends of the arm 112 can engage the recesses 118. Whenever the valve member 40 is rotated through 90°, the cylindrical portions 114 and 115 engage two of the recesses 118. Therefore, where the operator grips the handle 86 and rotates the operation shaft 84, a slight feeling of a halt is given to the operator whenever the handle is rotated through 90°.

Figure 2:
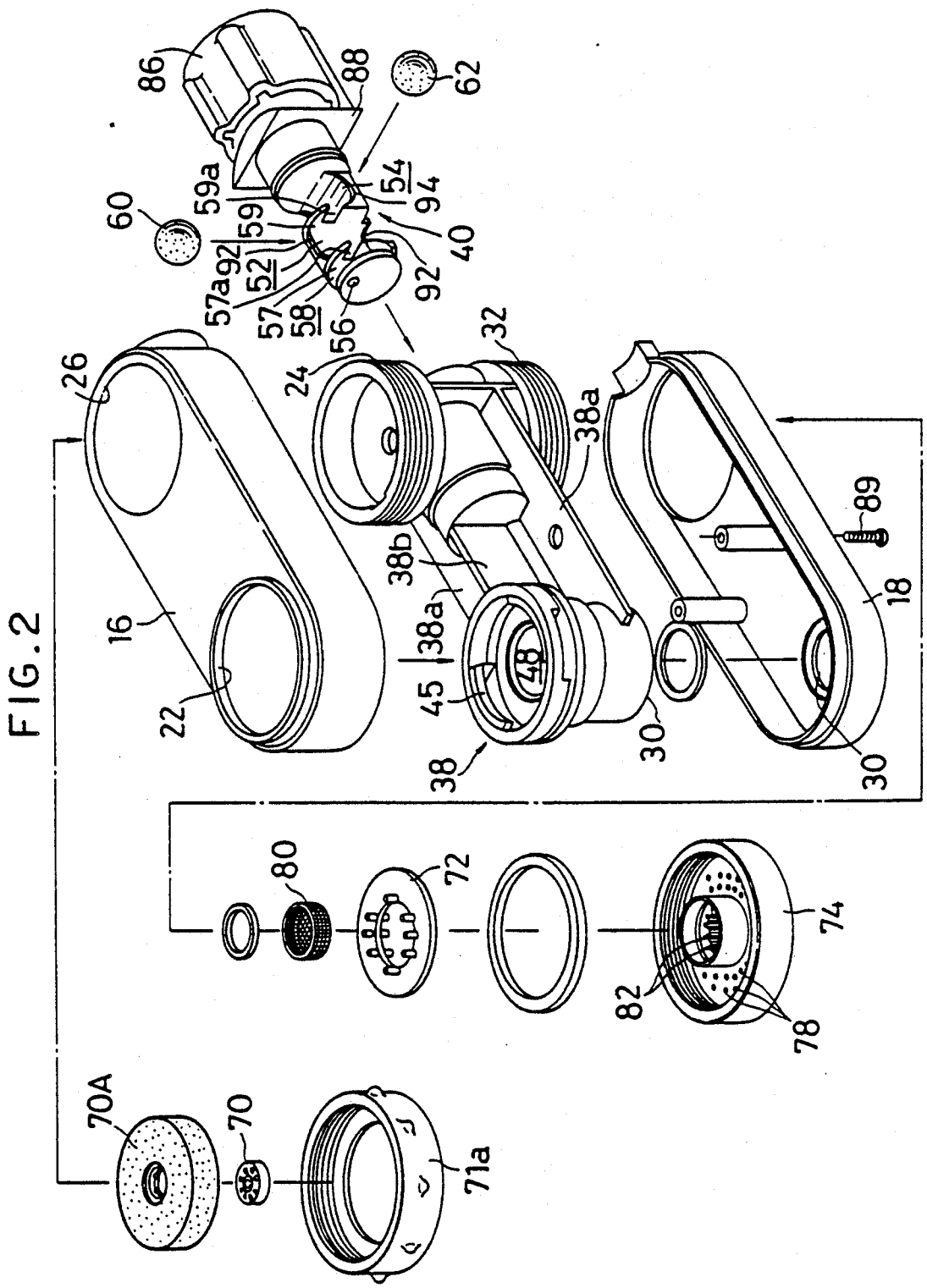
FIG. 2 is an exploded perspective view of a faucet and the multiway valve shown in FIG. 1.
Figure 3:
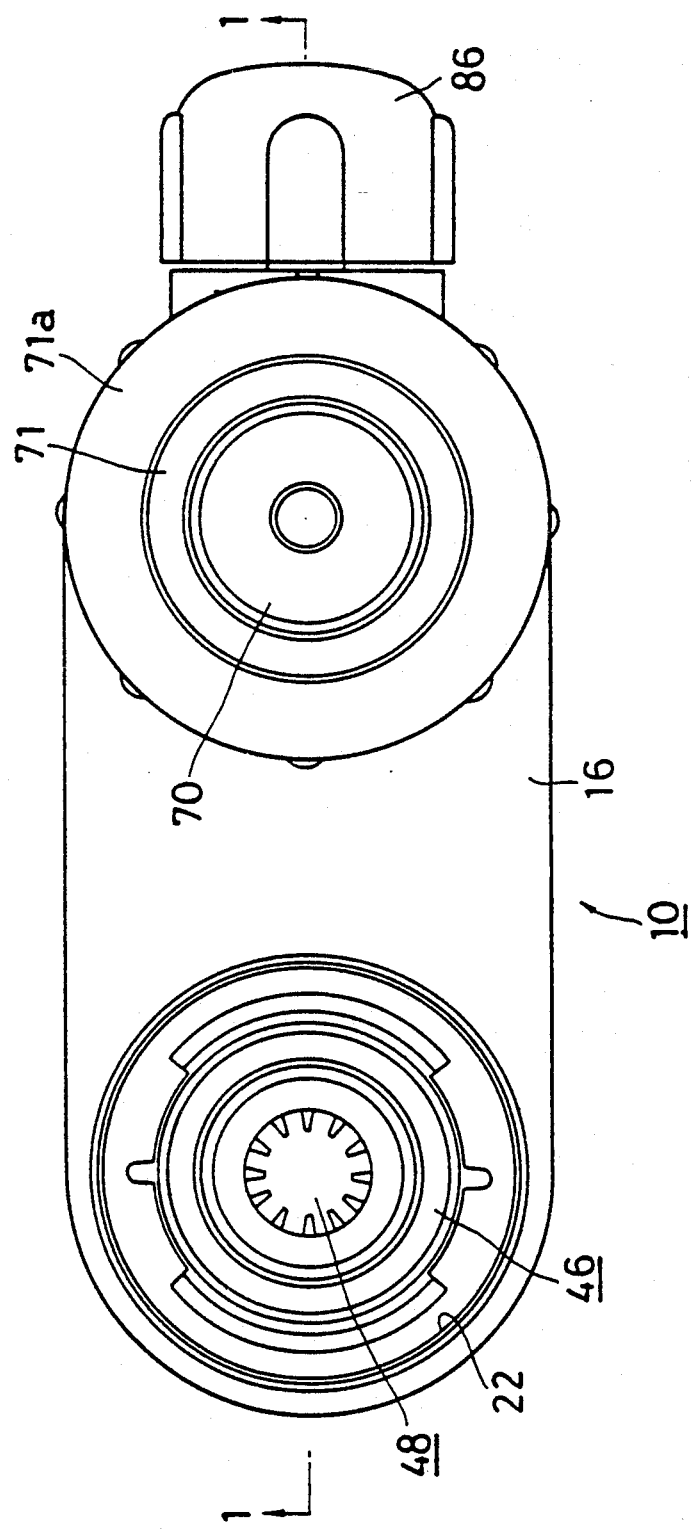
FIG. 3 is a plan view of the faucet shown in FIG. 2, and in which a water-purifying cartridge has been removed.
Figure 4:
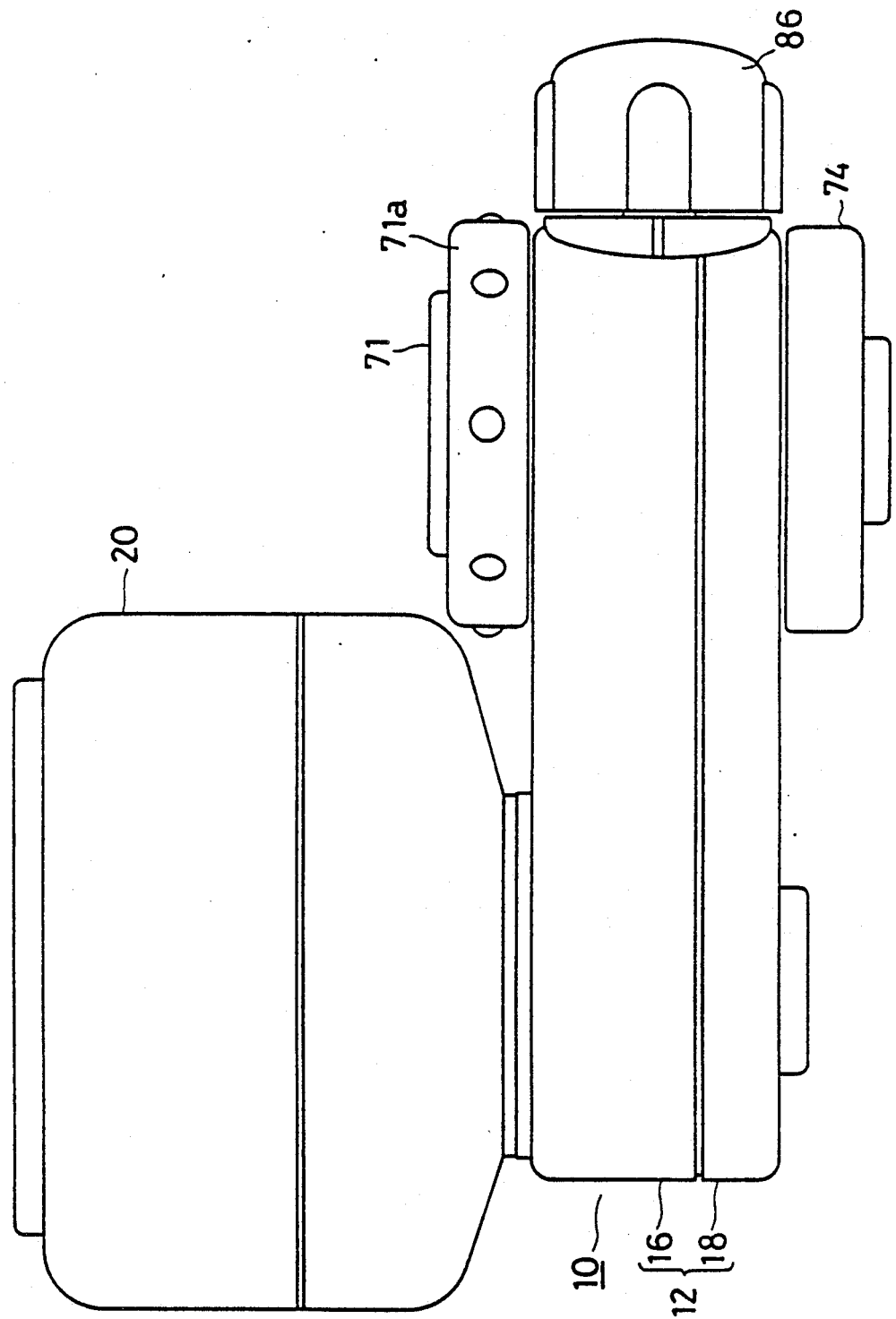
FIG. 4 is a front elevation view of the faucet shown in FIGS. 2 and 3, and in which the water-purifying cartridge is mounted.
Figure 5:
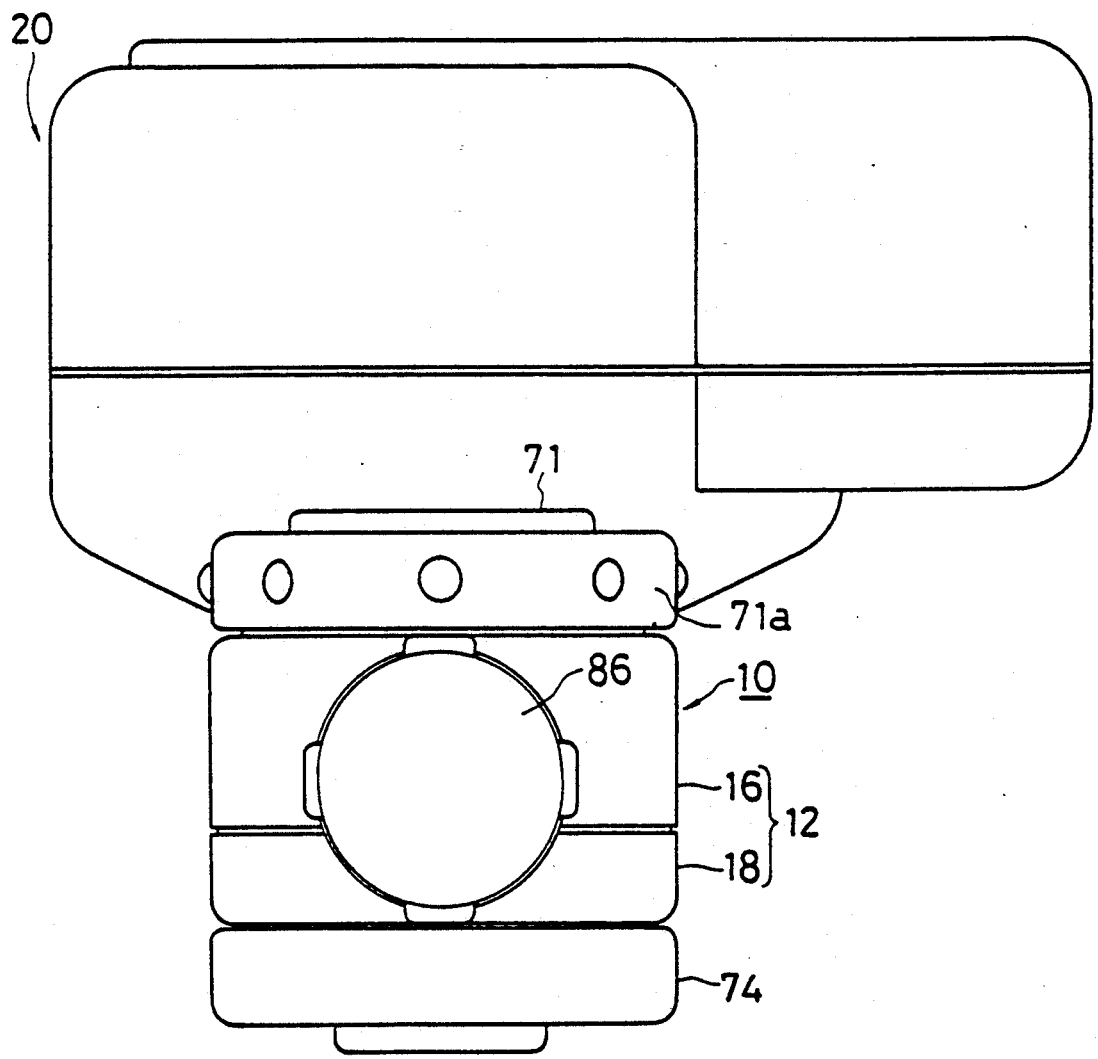
FIG. 5 is a right side elevation view of the faucet shown in FIG. 4.
Figure 6:
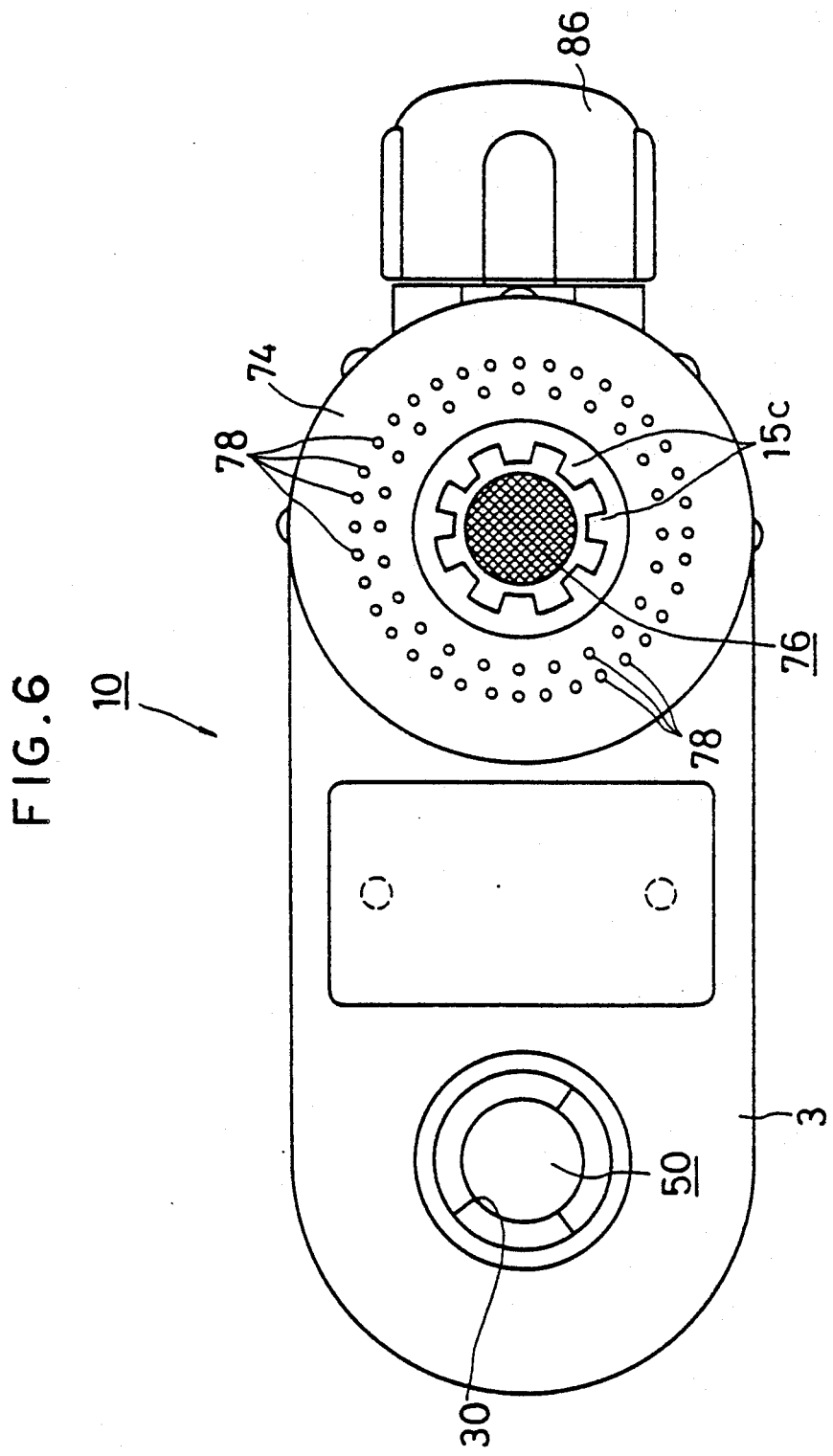
FIG. 6 is a bottom view of the faucet shown in FIG. 3, and in which the water-purifying cartridge has been removed.
Figure 7:
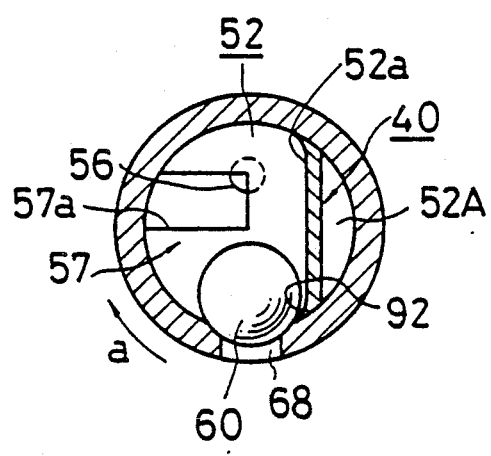
FIG. 7 is a cross-sectional view taken along line 7—7 of FIG. 1, for showing a valve casing.
Figure 8:
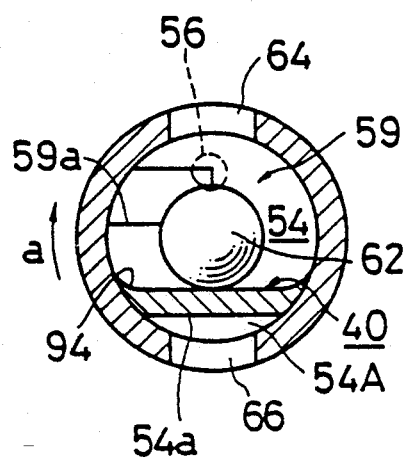
FIG. 8 is a cross-sectional view taken along line 8—8 of FIG. 1, for showing the valve casing.
Figure 12A:
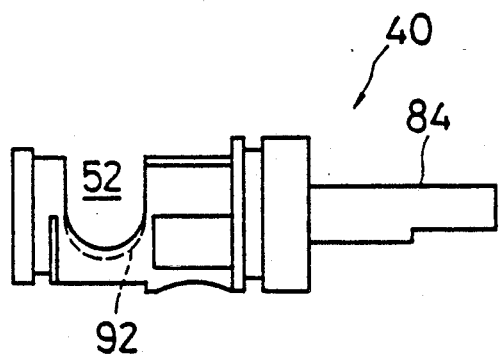
FIG. 12A is a front elevation view of the movable valve member shown in FIGS. 9A, 10A, and 11A.

As shown in FIG. 2, ribs 38a and 38b protrude from the valve casing 38. The ribs 38a and 38b bear against the inner surface of the faucet casing 12 to place the casing 38 in position. As shown also in FIG. 2, the upper casing 16 and the lower casing 18 are coupled together with a screw 89. An identification plate 18n (FIG. 1) is stuck to the lower casing 18 from below to conceal the head of the screw 89.

Figure 15:
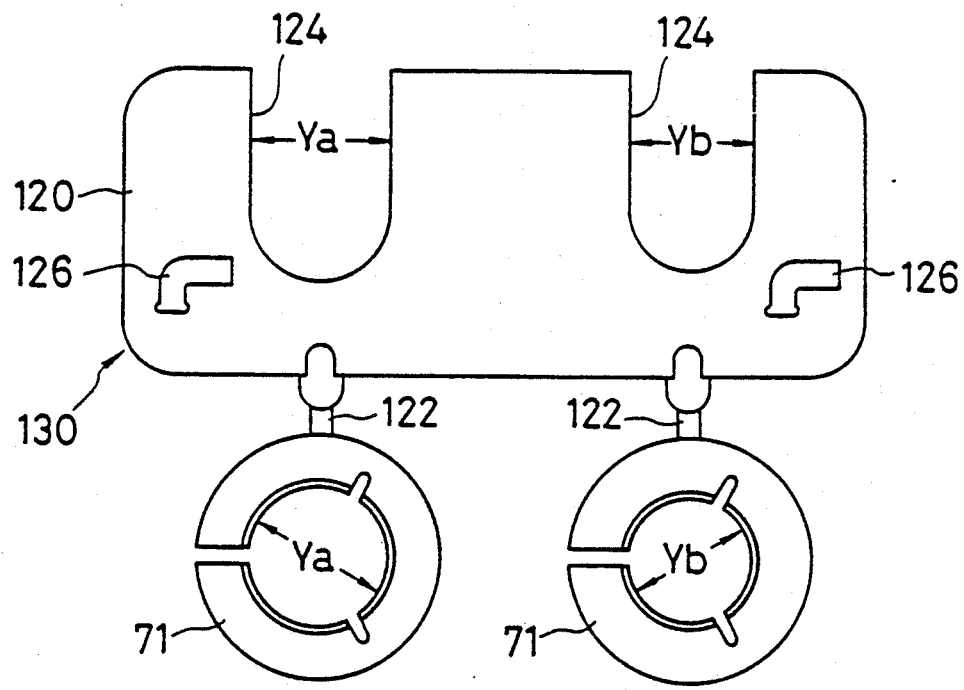
FIGS. 15 and 16 are plan views of adapter assemblies.
Figure 16:
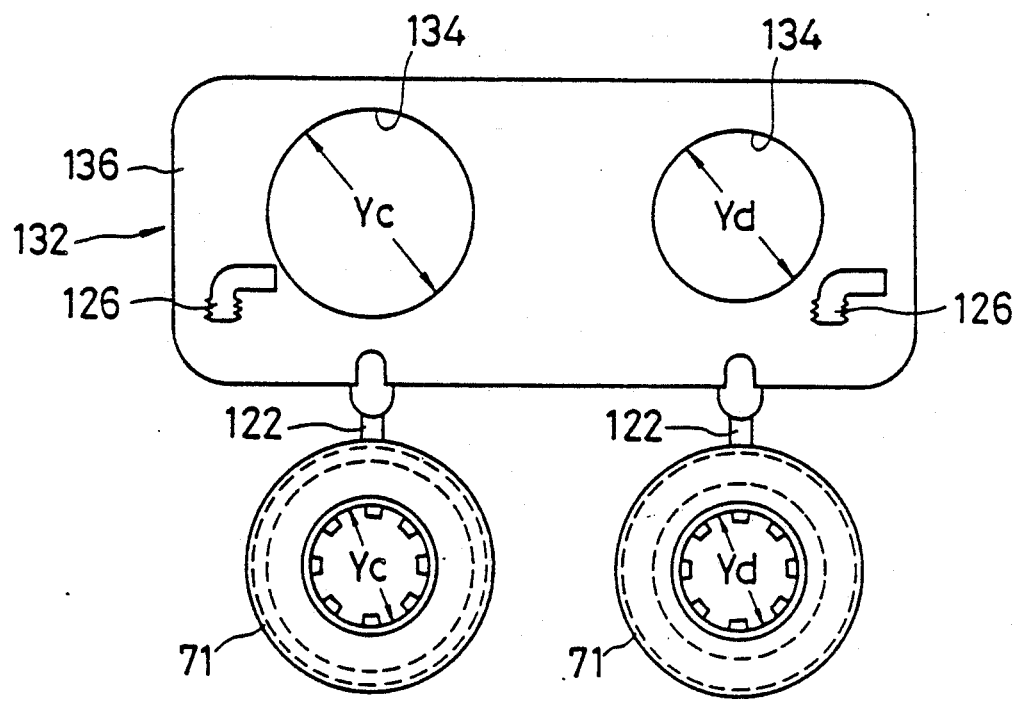

The faucet 10 is attached to the front end of the delivery pipe 71K via an adapter 71. As shown in FIGS. 15 and 16, commercially available plural adapters 71 having different inside diameters are connected to a gauge plate 120. The adapter 71 having the inside diameter adapted to the outside diameter of the delivery pipe is cut off, and the faucet 10 is attached to the delivery pipe 71K, using this adapter 71. Referring to FIG. 15, two adapters 71 having different inside diameters are formed integrally with the single gauge plate 120 via their respective connector portions 122, which can be bent and cut off by hand. Therefore, each individual adapter 71 can be separated. U-shaped gauge grooves 124 are formed opposite to the adapters 71 of the gauge plate 120. The widths Ya and Yb of the grooves 124 are the same as the widths Ya and Yb of the adapters 71. Display portions 126 bearing the outside diameters of the suited delivery pipes 71K are printed at corners of the gauge plate 120.

One tries to fit the gauge grooves 124 over the delivery pipe 71K to know the outside diameter of the pipe 71K from the gauge groove 124 successfully fitted over the delivery pipe. After knowing the gauge groove corresponding to the delivery pipe 71K, the adapter 71 corresponding to this gauge groove is cut off and can be used for the delivery pipe 71K. In the past, the outside diameter of the delivery pipe 71K was measured at the job site, and then the inside diameter of the adapter 71 was measured, followed by selection of the corresponding adapter 71. In this way, the operation was carried out at low efficiency. On the other hand, the adapters are integral with the above-described adapter assembly 130 and so the appropriate adapter can be easily selected without the need to make any measurement at the job site.

Referring to FIG. 16, an adapter assembly 132 comprises a gauge plate 136 provided with two circular gauge holes 134. Adapters 71 having inside diameters corresponding to the gauge holes 134 are separably integrated with the gauge plate 136 via their respective connector portions.

Also in this structure, the gauge holes 134 facilitate measurement of the outside diameter of the delivery pipe 71K to be mounted. Hence, the suited adapter 71 can be readily selected.

In the water purifier comprising the faucet 10 and the water-purifying cartridge 20, water entering from the entrance port 64 is directed to any one of the purified water exit port 50, the tap water exit port 76, and the shower exit port 78.

Figure 11A:
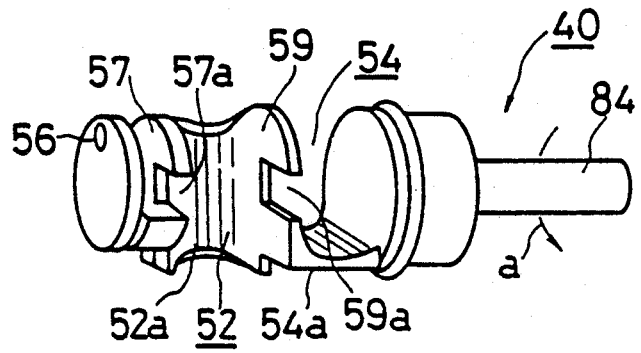
Figure 11B:
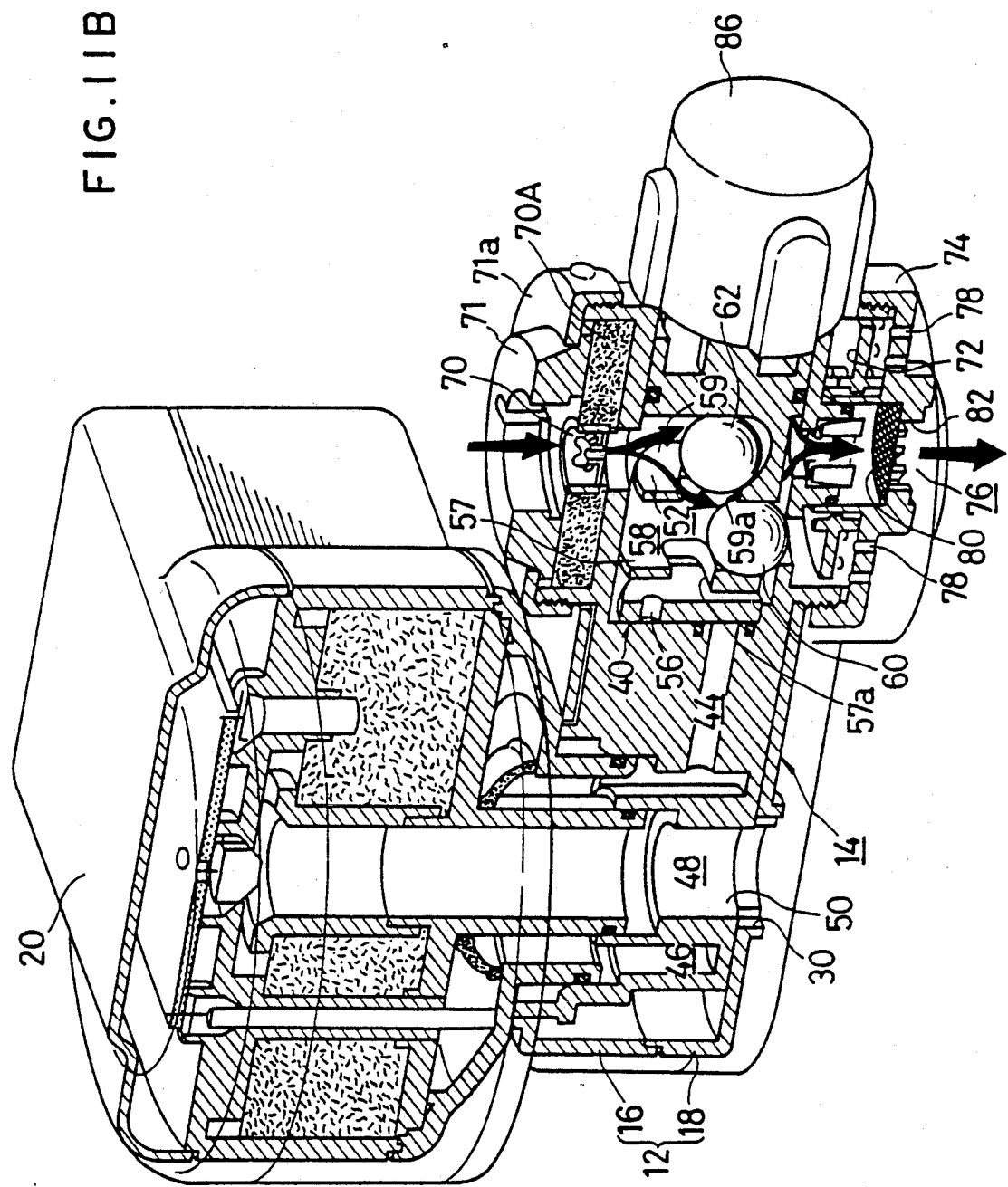

As shown in FIGS. 1, 11A, and 11B, when the posture of the movable valve member 40 is so set that the first ball-holding hole 52 faces both entrance port 64 and shower exit port 68 and that the second ball-holding hole 54 faces only the entrance port 64, the end surface opening 56 is disconnected from the end surface exit port 44a. At the same time, the shower exit port 68 is plugged up by the ball 60. Water entering from the entrance port 64 passes through both tap water exit port 66 and mesh 80, and is expelled from the tap water exit port 76.

Figure 10A:
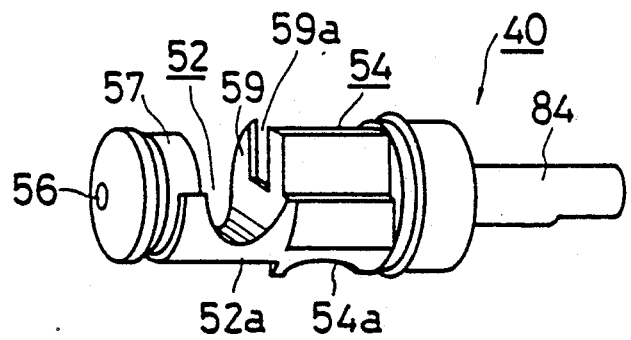
Figure 10B:
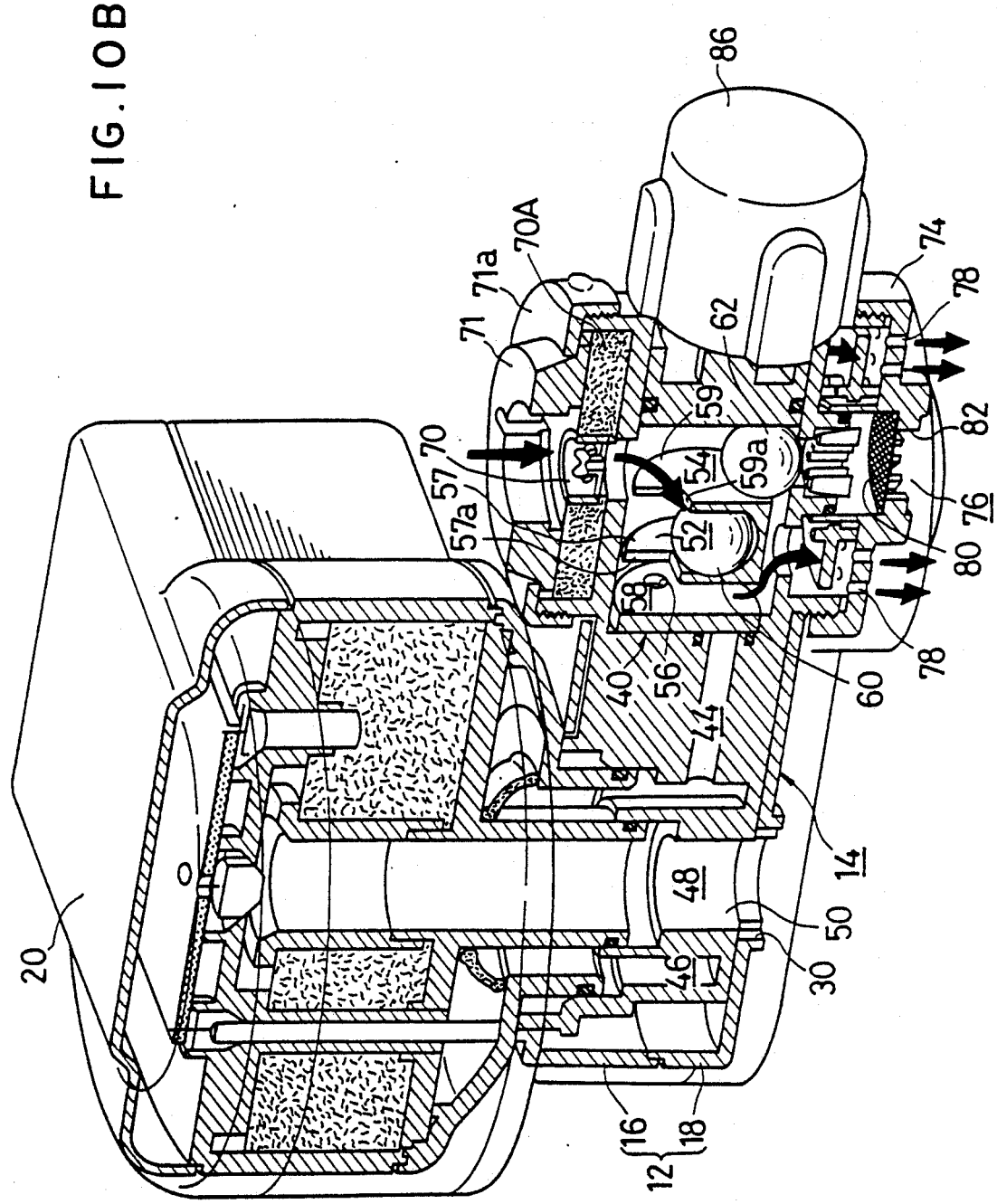

When the condition shown in FIGS. 10A and 10B is obtained by rotating the movable valve member 40 through 90° in the direction indicated by the arrow α in FIG. 11A from the condition shown in FIGS. 1, 11A, and 11B, the ball 60 is moved away from the shower exit port 68. Instead, the tap water exit port 66 is plugged up by the ball 62. The end surface exit port 44a remains plugged up. As a result, water entering from the entrance port 64 passes around the valve member 40, flows through the shower exit port 68 and the shower exit port 78, and pours out of the port 78. Since the baffle board 72 is disposed opposite to the shower exit port 78, water entering from the shower exit port 68 is constantly and uniformly supplied to the shower exit port 78.

Figure 9A:
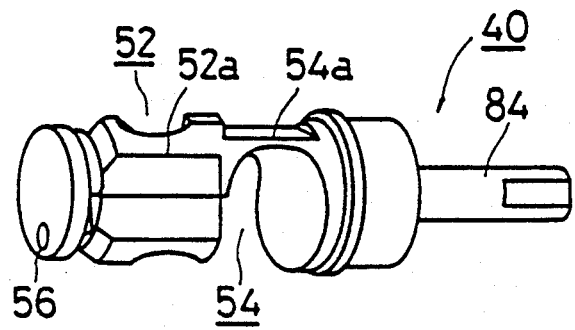
FIGS. 9A, 10A, and 11A are perspective views of the movable valve member 40 shown in FIG. 1, for showing different conditions.
Figure 9B:
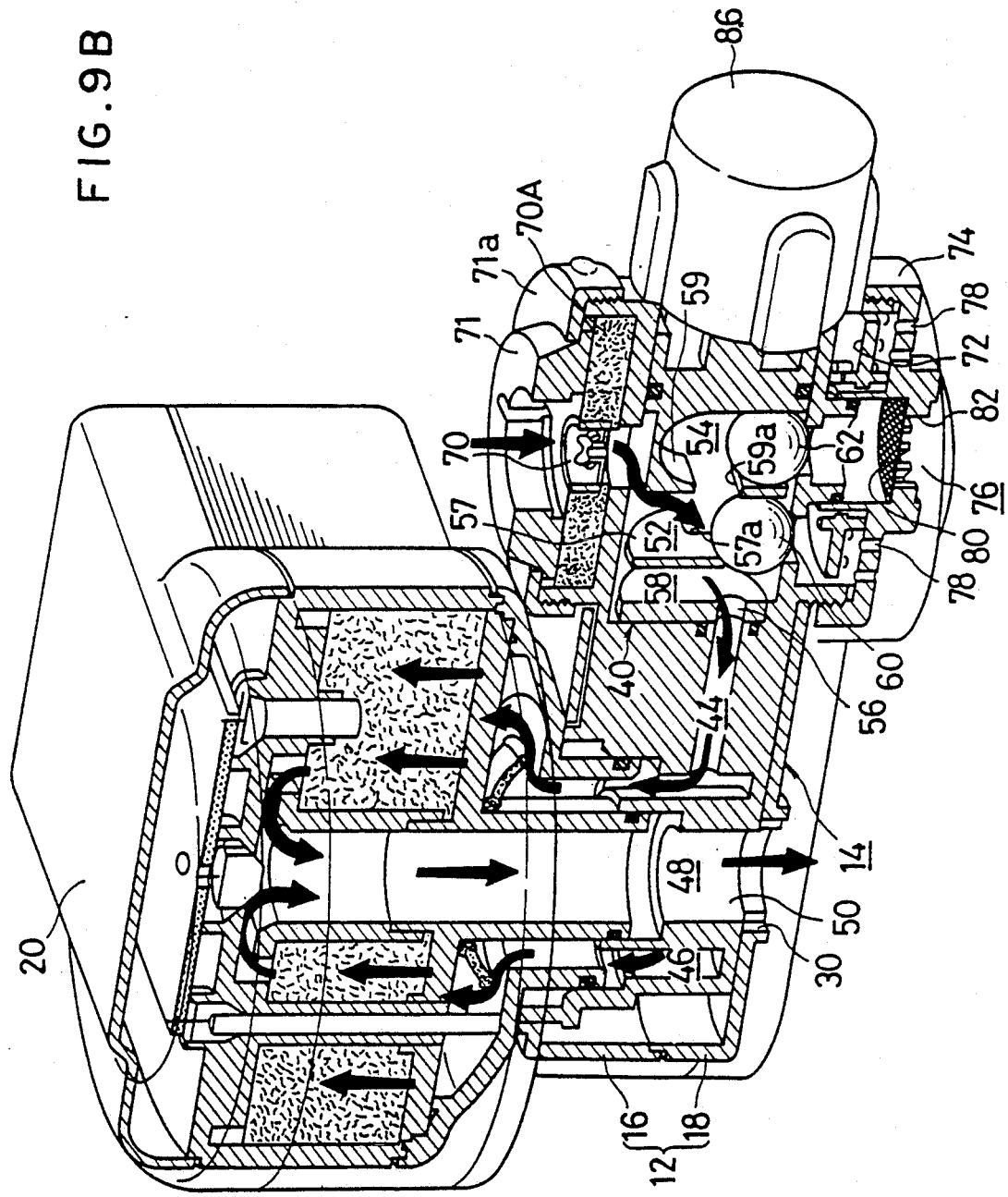
FIGS. 9B, 10B, and 11B are perspective views in cross section of the faucet shown in FIGS. 2-6, for showing different conditions.

When the condition shown in FIGS. 9A and 9B is obtained by rotating the valve member 40 through 180° from the condition shown in FIGS. 11A and 11B, the ball-holding hole 52 faces the shower exit port 68, so that the ball 60 plugs up the port 68. Since the ball-holding hole 54 also faces the tap water exit port 66, this port 66 is plugged up by the ball 62. Instead, the end surface opening 56 communicates with the connection passage 44. As a result, water entering from the entrance port 64 flows through the passage 58, the end surface opening 56, and the end surface exit port 44a in this order. The water flows through the connection passage 44, the outside passage 46, the water-purifying casing 20, and the inside passage 48 in this order. Finally, the water is expelled from the purified water delivery port 50.

When the pressure of water introduced from the entrance port is high, the area of the opening of the passage in the constant flow valve 70 is small. This reduces the flow of water expelled to thereby make the flow adequate. Therefore, if the water purifier is installed in a region where the pressure of supplied water is high, the velocity of water passing through the water-purifying casing 20 is reduced. Consequently, a sufficient amount of purified water can be supplied. Also, the hydraulic pressure applied to the movable valve member 40 is rendered low. Furthermore, only small force is needed to operate the handle 86.

Where the water purifier is installed in a region where the pressure of supplied water is low, the area of the opening of the passage in the constant flow valve 70 is made large. Therefore, a sufficient amount of expelled water can be obtained in this region. Where the faucet is installed in a region where the pressure of supplied water is especially low, the constant flow valve 70 can be omitted.

Figure 27:
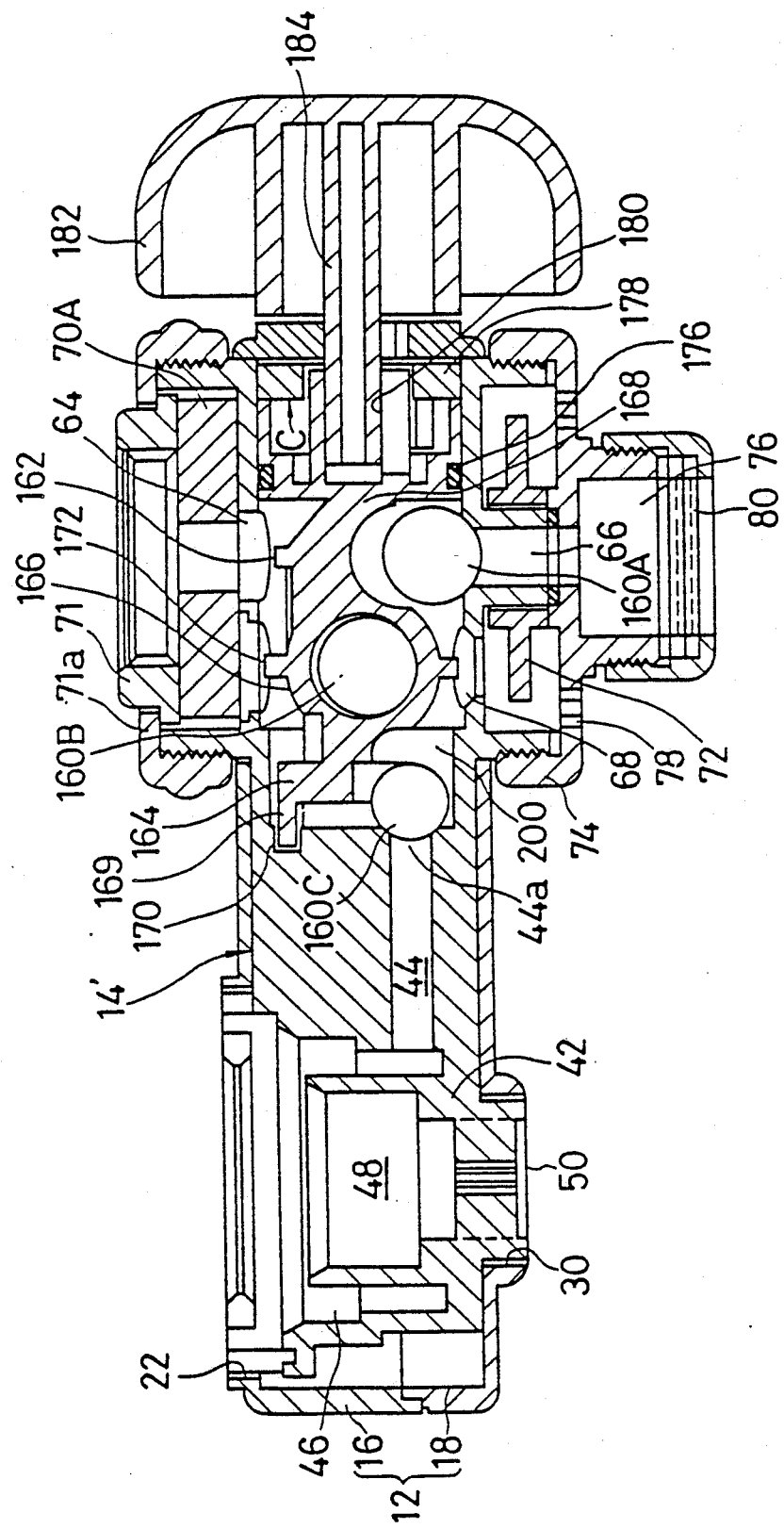
FIG. 27 is a vertical cross section view of another faucet according to the invention.
Figure 28:
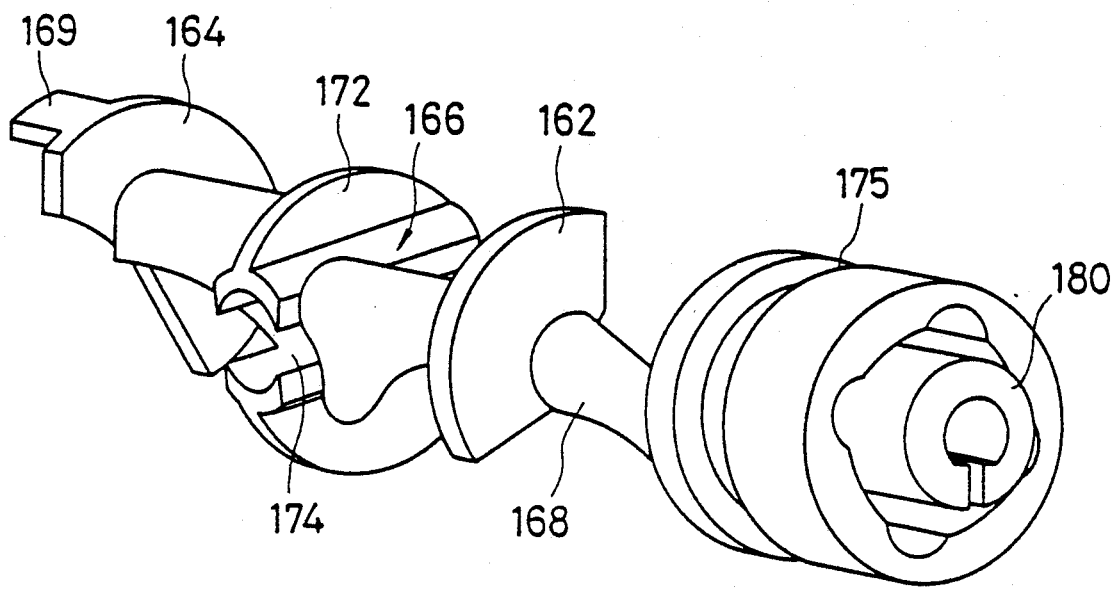
FIG. 28 is a perspective view of the cam shaft shown in FIG. 27.

Referring next to FIGS. 27-33, there is shown another rotating valve 14' comprising the above-described valve casing 38. Balls 160A, 160B, and 160C capable of plugging up the aforementioned exit ports 66, 68, 44a, respectively, are mounted in the casing 38. A cam shaft 168 (or a rotating shaft) is rotatably mounted in the casing 38. The cam shaft 168 is provided with two cams 162, 164, and a cylindrical portion 166. FIG. 28 is a perspective view of the cam shaft 168. FIGS. 30A-30J are views taken from various directions. As can be seen from these figures, the first cam 162 pushes away the ball 160A plugging up the regulated flow exit port 66. The cylindrical portion 166 retains the ball 160B plugging up the shower exit port 68 inside the cylindrical portion 166.

The second cam 164 pushes away the ball 160C plugging up the end surface exit port 44a that is the entrance of the connection passage 44, in order to open the exit port 44a. The first cam 162 and the second cam 164 are both substantially sectorial in shape.

The second cam 164 is provided with a guide pawl 169 protruding substantially axially. The pawl 169 engages the guide groove 170 formed in the end surface of the valve casing 38 which has the end surface exit port 44a. The groove 170 is shaped into an arc of about 270°. The guide groove 170 guides the movement of the guide pawl 169 in such a way that the cam shaft 168 can rotate through approximately 180°. The pawl spreads about 90° circumferentially of the cam shaft 168, which can rotate within a range of 180° (270−90=180).

The cylindrical portion 166 has arc-shaped ribs 172 on its side surfaces and a slit 174 to smoothen the flow of water through the water chamber 200. Also, the axial dimension of the cam shaft 168 is shortened to shorten the whole device.

An annular groove 175 is formed at the right end of the cam shaft 168. An O ring 176 is inserted in the groove 175 to prevent leakage of water. The cam shaft 168 is confined within the valve casing 38 by a retainer 178. A hole 180 of a modified cross section is formed in the end surface of the confined cam shaft 168. The operation shaft 184 of the handle 182 is inserted in the hole 180. When the handle 182 is rotated, the cam shaft 168 turns.

Figure 29:
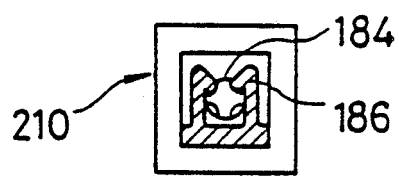
FIG. 29 is a side elevation view of a click mechanism which halts the cam shaft shown in FIGS. 27 and 28 at successive locking positions when the cam shaft is rotated.

The operation shaft 184 is equipped with a click mechanism 210 shown in FIG. 29 so that a feeling of click may be given to the operator when the handle 182 is rotated. More specifically, a portion of a crisscross star-shaped cross section is formed on a part of the operation shaft 184. The valve casing has resilient pawls 186 engaging the four recesses of the star-shaped portion. When the shaft 184 rotates, it engages or flips the pawls 186. In this way, whenever the shaft makes a ¼ revolution, a feeling of click is given to the operator.

Figure 33A:
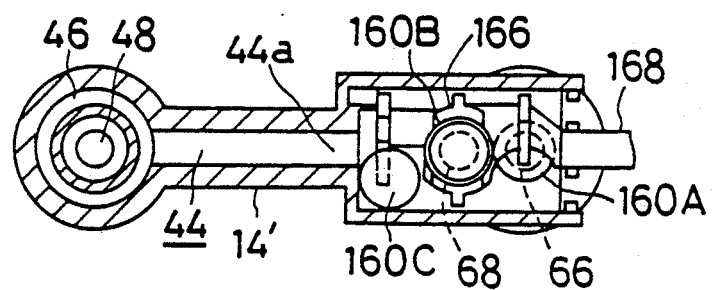
Figure 33B:
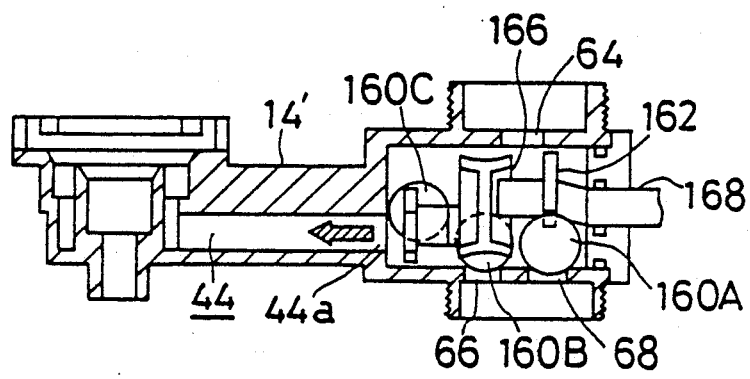
Figures 33C, 33D, 33E:
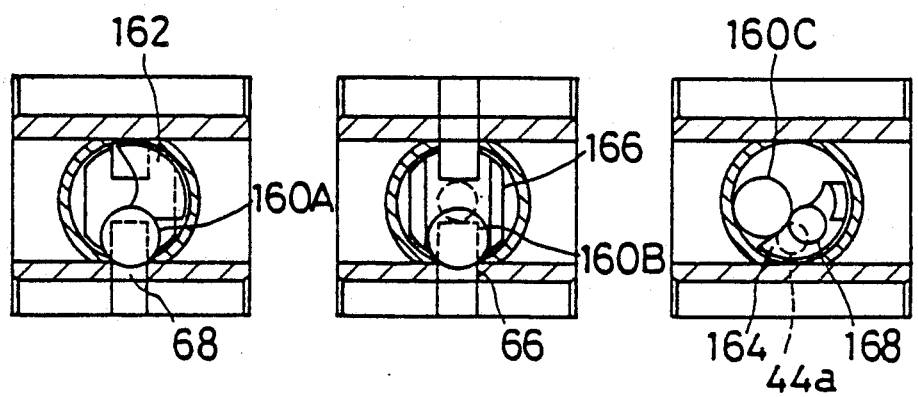

The operation of the multiway valve is next described by referring to FIGS. 31A-33E. FIGS. 31A, 32A, and 33A are plan views in cross section of the multiway valve. FIGS. 31B, 32B, and 33B are vertical cross sections of the valve. FIGS. 31C, 32C, and 33C are views illustrating the operation of the first cam 162. FIGS. 31D, 32D, and 33D are views illustrating the operation of the cylindrical portion 166. FIGS. 31E, 32E, and 33E are views illustrating the operation of the second cam 164.

When water is expelled from the regulated flow delivery port 66, the first cam 162 has pushed away the ball 160A, thus opening the delivery port 66. At this time, the axis of the cylindrical portion 166 lies in the vertical direction, and the ball 160B inside it closes the shower exit port 68. The second cam 164 is located just above the ball 160C and is not in contact with it. Therefore, the connection passage 44 is shut off.

When shower is used, the cam shaft 168 has rotated through 90° from the position in which the above-described regulated flow of water was obtained. The first cam 162 is located above the ball 160A and is not in contact with it. The regulated flow delivery port 66 is plugged up by the ball 160A. The axis of the cylindrical portion 166 lies in the horizontal direction, and the ball 160B is held inside it. In this state, the ball 160B is remote from the shower exit port 68 to open it. The second cam 164 is positioned above the ball 160C, which plugs up the exit port 44a.

When water is discharged from the purified water delivery port 50, the cam shaft 168 has rotated through 90° from the position for the shower described above. The first cam 162 is above the ball 160A, which plugs up the regulated flow delivery port 66. The cylindrical portion 166 has rotated through 180° from the position for the regulated flow described already. The ball 160B again drops to plug up the shower exit port 68. The second cam 168 pushes away the ball 160C, thus opening the exit port 44a.

In this way, the cam shaft 168 rotates through 90° at a time and, therefore, any one of the exit ports 66, 68, 44a is opened by the action of the cylindrical portion 166, the first cam 162, and the second cam 164. As a result, the delivery passage is switched.

As described thus far, in the present example, the exit ports 66, 68, 44a are opened and closed by the action of the balls 160A-160C, thus dispensing with a conventional substantially cylindrical movable valve member. The area of the portion of the valve member which makes sliding contact with the inner surface of the valve casing can be made small. Referring to FIG. 27, this portion making sliding contact includes the portion close to the O ring 176, the arc-shaped outer surface of the first cam 162, the arc-shaped outer surface of the second cam 164, the outer surfaces of the ribs 172 of the cylindrical portion 166, and the guide pawl 169. These portions are not watertight except for the O ring 176 and so it is not necessary that they be slided with a large force. Consequently, the force needed to rotate the cam shaft, hence the handle 182, is smaller than the force required heretofore.

In the present example, the cylindrical portion 166 is not a perfect cylinder but is provided with the slit 174. This reduces the axial dimension of the cam shaft 168. Hence, the whole device can be reduced in the axial direction of the cam shaft. The position of the cam shaft 168 does not agree with the center of rotation of the shaft 168. Rather, the cam shaft is substantially cranked as shown in FIGS. 30B and 30C.

In the present invention, the cylindrical portion 166 can have a polygonal cross section. The cylindrical portion 166 may also be provided with a slit extending axially and have a substantially C-shaped cross section.

In the examples described thus far, the regulated flow delivery port 66 is opened when the first cam 162 pushes away the ball 160A. In the present invention, the regulated flow exit port may be opened when the cylindrical portion holds the ball and is placed horizontal. That is, any exit port can be used for regulated flow, for shower, or for connected outflow, and the usage can be changed according to the need.

In the above examples, the multiway valve uses three balls. The multiway valve may also include four or more balls.

INDUSTRIAL APPLICABILITY

As described thus far, in the novel multiway valve, the exit ports formed in the outer surface of the valve casing are opened and closed by the balls. The area of the portion making sliding contact can be made small. The shaft can be rotated with a small force. The valve can be operated lightly.

I claim:

1. A multiway valve comprising:
    a valve casing provided with an entrance port, plural exit ports and an outer surface, one exit port being formed at one end surface of the valve casing and the other exit ports being formed in the outer surface of the valve casing;
    a valve member rotatably inserted in the valve casing for opening and closing the exit ports and having an end surface;
    balls mounted in the valve casing so as to be capable of plugging up the exit ports in the outer surface of the casing;
    arms formed integrally with the valve member and acting to move the balls; and
    a seal which surrounds the exit port at the end surface and makes sliding contact with the end surface of the valve member.

2. The multiway valve of claim 1, wherein a groove receiving a lip seal is formed around the exit port in the end surface of the valve casing, and wherein the lip seal has a thickened portion near its front end as viewed in the direction in which the seal is inserted into the groove.

3. The multiway valve of claim 1, wherein a groove receiving a lip seal is formed around the exit port in the end surface of the valve casing, and wherein plates protruding from the end surface are mounted between the outer surface of the lip seal and the inner surface of the groove.

4. The multiway valve of claim 1, wherein a groove receiving a lip seal is formed around the exit port in the end surface of the valve casing, and wherein the fringe of the groove protrudes from the end surface.

5. The multiway valve of claim 1, wherein said valve member has ball-holding holes receiving the balls capable of plugging up the exit ports in the outer surface, the side walls of the ball-holding holes having notches, and wherein the fringes of the openings of the notches are chamfered to prevent the balls from becoming damaged.

6. A multiway valve comprising:
    a valve casing provided with an outer surface, an entrance port and plural exit ports;
    balls mounted in the valve casing so as to be capable of plugging up the exit ports;
    a valve member rotatably inserted in the valve casing for opening and closing the exit ports which are formed in the outer surface of the valve casing, said valve member including a front end and ball-holding holes for receiving the balls for plugging up the exit ports in the outer surface, said ball-holding holes having side walls with notches and fringes of the notches, said fringes being chamfered to prevent the balls from becoming damaged;
    arms formed integrally with the valve member and acting to move the balls; and
    pawls formed at the front end of the valve member for scooping up the balls.

7. A multiway valve comprising:
    a valve casing provided with an entrance port and plural exit ports;
    a rotating shaft inserted in the valve casing;
    balls mounted in the valve casing so as to be capable of plugging up the exit ports;
    cams which are formed on the rotating shaft and one of which, when the shaft reaches any one of certain angular positions, pushes away the corresponding one of the balls to open the corresponding exit port; and a cylindrical portion which is formed on the rotating shaft and holds the balls and which, when the shaft reaches any one of two angular positions spaced apart about 180°, permits the corresponding one of the balls to drop to close the corresponding exit port.

8. The multiway valve of claim 7, wherein said valve member has ball-holding holes receiving the balls capable of plugging up the exit ports in the outer surface, the side walls of the ball-holding holes having notches, and wherein the fringes of the openings of the notches are chamfered to prevent the ball from becoming damaged.

* * * * *